(12) United States Patent
Dolphin et al.

(10) Patent No.: US 8,700,527 B2
(45) Date of Patent: Apr. 15, 2014

(54) MERCHANT BILL PAY

(75) Inventors: Mark C. Dolphin, Lincoln, RI (US);
David M. Grigg, Rock Hill, SC (US);
Michael W. Upton, Charlotte, NC (US);
Darrell F. Stanfield, York, SC (US);
Darrell Johnsrud, Camas, WA (US)

(73) Assignee: Bank of America Corporation, Charlotte, NC (US)

( * ) Notice: Subject to any disclaimer, the term of this patent is extended or adjusted under 35 U.S.C. 154(b) by 74 days.

(21) Appl. No.: 13/342,077

(22) Filed: Jan. 1, 2012

(65) Prior Publication Data

US 2013/0018785 A1    Jan. 17, 2013

Related U.S. Application Data

(60) Provisional application No. 61/507,954, filed on Jul. 14, 2011.

(51) Int. Cl.
*G06Q 40/00* (2012.01)

(52) U.S. Cl.
USPC ............................... 705/40; 705/35; 705/39

(58) Field of Classification Search
USPC ............................... 705/35, 36 R, 37, 39, 40
See application file for complete search history.

(56) References Cited

U.S. PATENT DOCUMENTS

| | | | |
|---|---|---|---|
| 7,533,065 B2 * | 5/2009 | Piikivi | 705/76 |
| 7,742,984 B2 * | 6/2010 | Mohsenzadeh | 705/39 |
| 2002/0198849 A1 * | 12/2002 | Piikivi | 705/76 |
| 2003/0119478 A1 * | 6/2003 | Nagy et al. | 455/408 |
| 2007/0250450 A1 * | 10/2007 | Ramlau-Hansen et al. | 705/64 |
| 2009/0171837 A1 * | 7/2009 | Moreno | 705/40 |
| 2011/0270747 A1 * | 11/2011 | Xu | 705/40 |
| 2012/0016795 A1 * | 1/2012 | Hill et al. | 705/39 |

* cited by examiner

*Primary Examiner* — Lalita M Hamilton
(74) *Attorney, Agent, or Firm* — Michael A. Springs; Moore & Van Allen PLLC; Sreenivas Vedantam

(57) ABSTRACT

Embodiments of the invention are directed to systems, methods and computer program products for transmitting, via an intermediary system, a payment request from a payment requestor to a customer. In some embodiments, a method includes: (a) receiving, at an intermediary computing device, the payment request from a source system, wherein the payment request includes a payment amount and an alias associated with a payment recipient, (b) in response to receiving the payment request, determining, via a computing device processor, whether the payment recipient is a registered payment recipient based on the alias, and (c) in response to determining the payment recipient is a registered payment recipient based on the alias, communicating, via the intermediary computing device, the payment request to the payment recipient based on the payment recipient being the registered payment recipient.

18 Claims, 29 Drawing Sheets

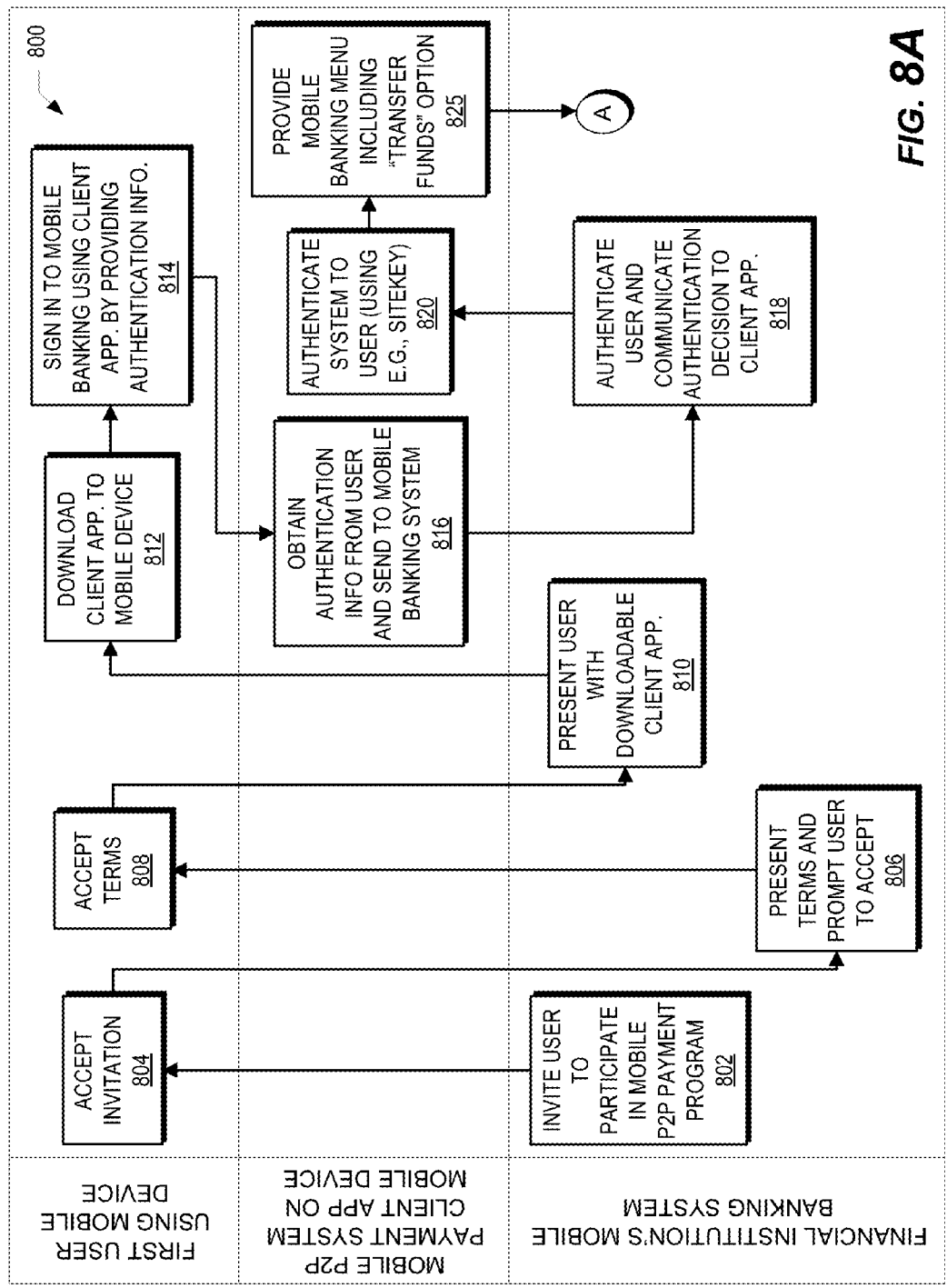

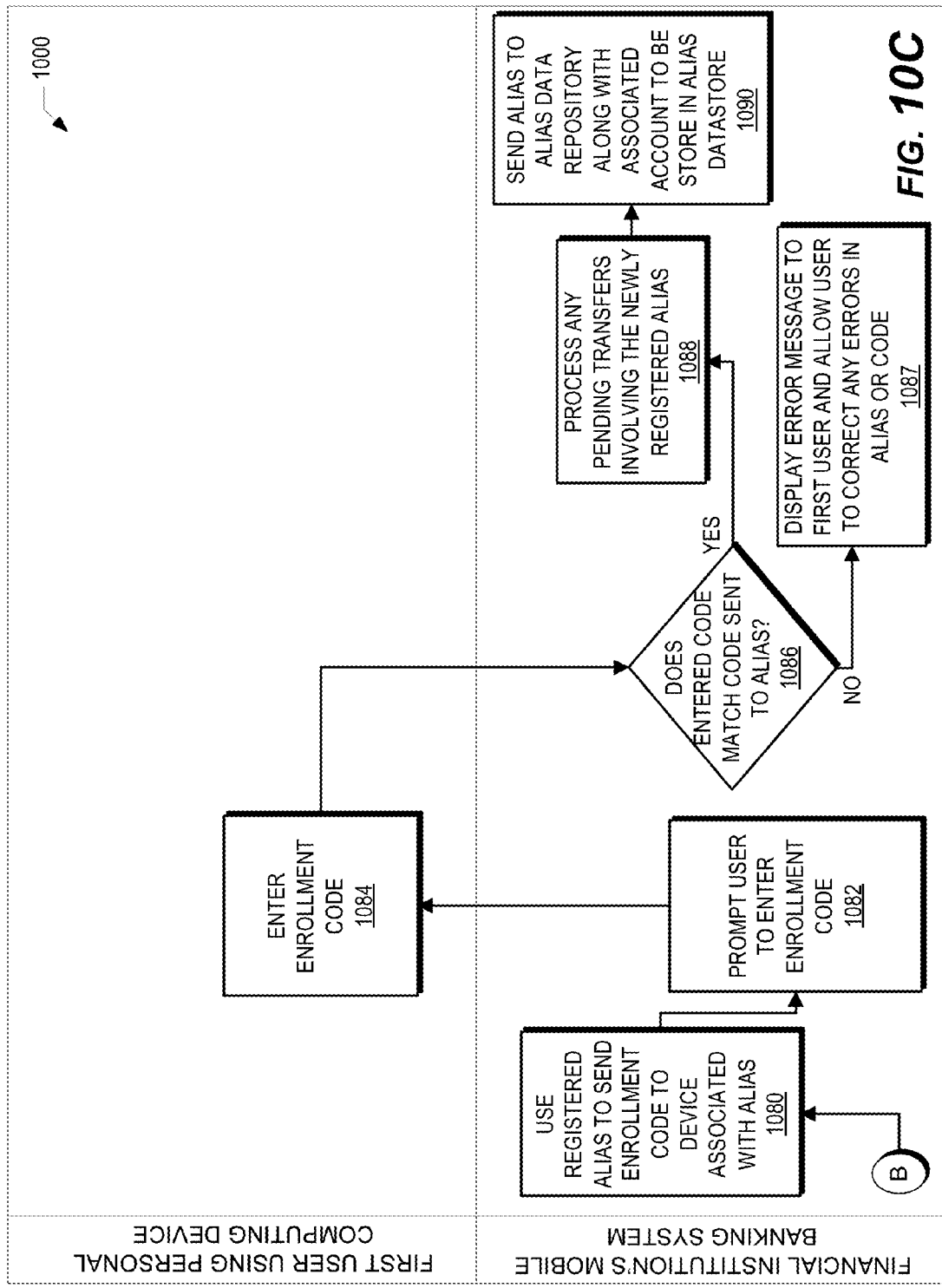

MERCHANT BILL PAY

CROSS-REFERENCE TO RELATED APPLICATIONS

This application claims priority to U.S. Provisional Patent Application Ser. No. 61/507,954, filed Jul. 14, 2011, entitled "Merchant Bill Pay," the entirety which is incorporated herein by reference.

BACKGROUND

With the wide adoption of credits cards, debit cards, electronic payment devices, online shopping systems, and online banking systems, very few people today carry a lot of cash or write many checks. However, people still need to transfer money to each other for all sorts of reasons. For example, a person may want to pay a friend back for money recently borrowed from the friend, or a person may want to send money to a relative as a gift. Giving or lending money to another person, however, can be difficult when you don't have cash on hand and/or if the person is not physically present. The process may need to involve going to an automated teller machine (ATM) or mailing the person a check, both of which can be time consuming and inconvenient depending on the situation.

Money can be transferred from one person to another using electronic banking systems, but these systems traditionally require that the sender know account information for the receiver in order to instruct the bank to transfer money to the proper account. Most people do not know the account numbers of their friends, nor do most people want to widely publicize their account numbers for security reasons.

Some third party service providers try to facilitate payments from one person to another, but many people do not like these systems because they require opening yet another account with another online entity, remembering yet another username and password, and disclosing confidential financial institution account information to these other companies. In addition to the inconvenience and the security concerns, these systems generally take time set up and are not user-friendly.

For all these reasons and others, there is a need for improved user-friendly systems and methods for transferring money (including sending payment requests and satisfying payment requests) between two people and/or other entities, especially if such systems can transfer money directly to and/or from financial institution accounts, such as demand deposit accounts (e.g., checking accounts), savings accounts, and/or credit accounts.

BRIEF SUMMARY

Embodiments of the present invention address these and/or other needs by providing an innovative person-to-person (P2P) payment system along with a user-friendly interface and process for sending and receiving P2P payments. Advantageously, embodiments of the invention do not necessarily require users to share confidential account information with others in order to send and receive payments. In fact, embodiments of the invention do not require that the payment sender know any information about the financial accounts of the intended payment recipient. Furthermore, embodiments of the invention enable users to attempt to make payments to persons that are not customers of the same financial institution and to persons that are not customers of any financial institution. Embodiments of the invention also create a "viral" account opening and payment system registration process whereby one person's use of the system encourages others to use the system.

More specifically, embodiments of the invention allow an entity to transfer funds to another entity using a mobile telephone number, electronic mail (email) address, and/or other alias of the transfer recipient. The assignee of the present application describes some embodiments of such an invention in U.S. Provisional Patent Application No. 60/991,172, filed on Nov. 29, 2007, and co-pending U.S. patent application Ser. No. 12/038,177, filed on Feb. 27, 2008, as well as in U.S. patent application Ser. Nos. 12/881,071, 12/881,073, 12/881,074, and 12/881,080 continuing therefrom; all of which are incorporated herein by reference. Embodiments of the present invention include and build off of those earlier embodiments to provide an improved P2P payment system and a more user-friendly, secure, and convenient user interface and method.

Furthermore, embodiments of the invention include and build off of the following applications sharing a common assignee with the present application: U.S. Provisional Patent Application No. 61/410,085, filed on Nov. 4, 2010; U.S. Provisional Patent Application No. 61/410,087, filed on Nov. 4, 2010; U.S. Design patent application Ser. No. 29/378,420, filed on Nov. 4, 2010; and U.S. Design patent application Ser. No. 29/378,418, filed on Nov. 4, 2010, and as such, herein incorporate these applications by reference.

As described in greater detail below, the user interface can be incorporated into the mobile banking website of a bank or other financial institution. A user can authenticate her identity using the mobile banking authentication system and the user's authentication information and procedures that are already known to the user for interacting with mobile banking. The user can then use the mobile banking interface to register a mobile phone number, email address, or other alias by associating the number, address, or other alias with one of the user's financial institution accounts. This association is then stored in a data repository that can later be accessed by the bank and, in some cases, other financial institutions. Some embodiments of the invention provide a system for verifying that the alias is owned, held, or otherwise associated with the user, the system including immediately sending a code to the user's device using the alias (e.g., sending a code in a text or email) and having the user enter the code into the mobile banking interface shortly thereafter.

The mobile banking interface can also be used to initiate transfers to others using aliases. In some embodiments of the invention, a user can create a transfer recipient by entering the recipient's name, alias (e.g., mobile phone number or email address), and a descriptive name for the person, commonly referred to herein as a nickname. The user can then create a transfer request by using the mobile banking interface to select an account associated with the user's mobile banking account, enter or select the nickname of the saved recipient, and enter a monetary amount. The banking system then accesses the data repository to determine whether the alias is registered and thereby associated with a financial institution account. If the alias is registered, the banking system sends a transfer notification to the recipient using the alias and/or initiates the funds transfer. If the alias is not registered, then the banking system uses the alias to send the transfer recipient a notification (e.g., a text message, email address or the like), the notification telling the person that there is a pending transfer that will be processed if the person registers her alias with an existing financial institution account and/or opens a new financial institution account. The notification then provides a link to the mobile banking website, a mobile banking website, or a mobile banking application that allows the person to easily register an existing account or open a new account.

Embodiments of the invention also provide a user interface that makes it easy for users to monitor their current, future, pending, and past person-to-person (P2P) and/or person-to-merchant (P2M) funds transfers as well as their saved transfer recipient list, alias registrations, incoming transfers, and/or other related information.

It should be appreciated that at least some embodiments of the invention provide a more convenient, user friendly, and secure P2P payment system because it is provided by the user's bank, through the bank's mobile banking system with which the user is already familiar. In at least some embodiments, the user may not need to share personal or confidential information, such as account information, with people or businesses outside of the user's bank. The user can feel more secure having P2P payment services handled by their bank and have the convenience of being able to directly send money from and/or receive money into the user's one or more financial institution accounts.

Embodiments of the invention are also directed to systems, methods and computer program products for transmitting, via an intermediary system, a payment request from a payment requestor to a customer. In some embodiments, a method includes: (a) receiving, at an intermediary computing device, the payment request from a source system, wherein the payment request includes a payment amount and an alias associated with a payment recipient, (b) in response to receiving the payment request, determining, via a computing device processor, whether the payment recipient is a registered payment recipient based on the alias, and (c) in response to determining the payment recipient is a registered payment recipient based on the alias, communicating, via the intermediary computing device, the payment request to the payment recipient based on the payment recipient being the registered payment recipient. In some embodiments, the alias is at least one of: a mobile phone number, an email address, a social network account, URL address, picture, logo, brand, trademark, graphical art, and the like. In some embodiments, the method further includes, in response to determining the payment recipient is not a registered payment recipient based on the alias, returning the payment request to the source system and sending an invitation to the payment recipient to become a registered payment recipient. In some embodiments, the source system is associated with an entity, and the payment recipient does not provide the payment recipient's entity account number to the intermediary computing device.

Moreover, in some embodiments, the determining whether the payment recipient is a registered payment recipient further comprises: determining whether the alias included in the payment request matches an alias in an alias data repository, wherein the alias data repository comprises information regarding users and aliases associated with each user; and determining whether a name included in the payment request matches a name associated with the alias in the alias data repository.

In some embodiments, the method further includes communicating the payment request to the payment recipient as a text message, where the text message indicates one or more response options. A first response option enables the payment recipient to immediately pay the payment amount associated with the payment request, a second response option enables the payment recipient to schedule payment of the payment amount on a selected date, and a third response option enables the payment recipient to select an account to satisfy the amount of the payment request.

In some embodiments, the method further includes communicating the payment request to the payment recipient as a mobile application alert, where the mobile application alert includes one or more selectable options. A first selectable option enables the payment recipient to immediately pay the payment amount associated with the payment request, a second selectable option enables the payment recipient to schedule payment of the payment amount on a selected date, and a third selectable option enables the payment recipient to select an account to satisfy the amount of the payment request.

Embodiments of the invention also include systems and computer program products that can be used to implement the various features of the methods described herein. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
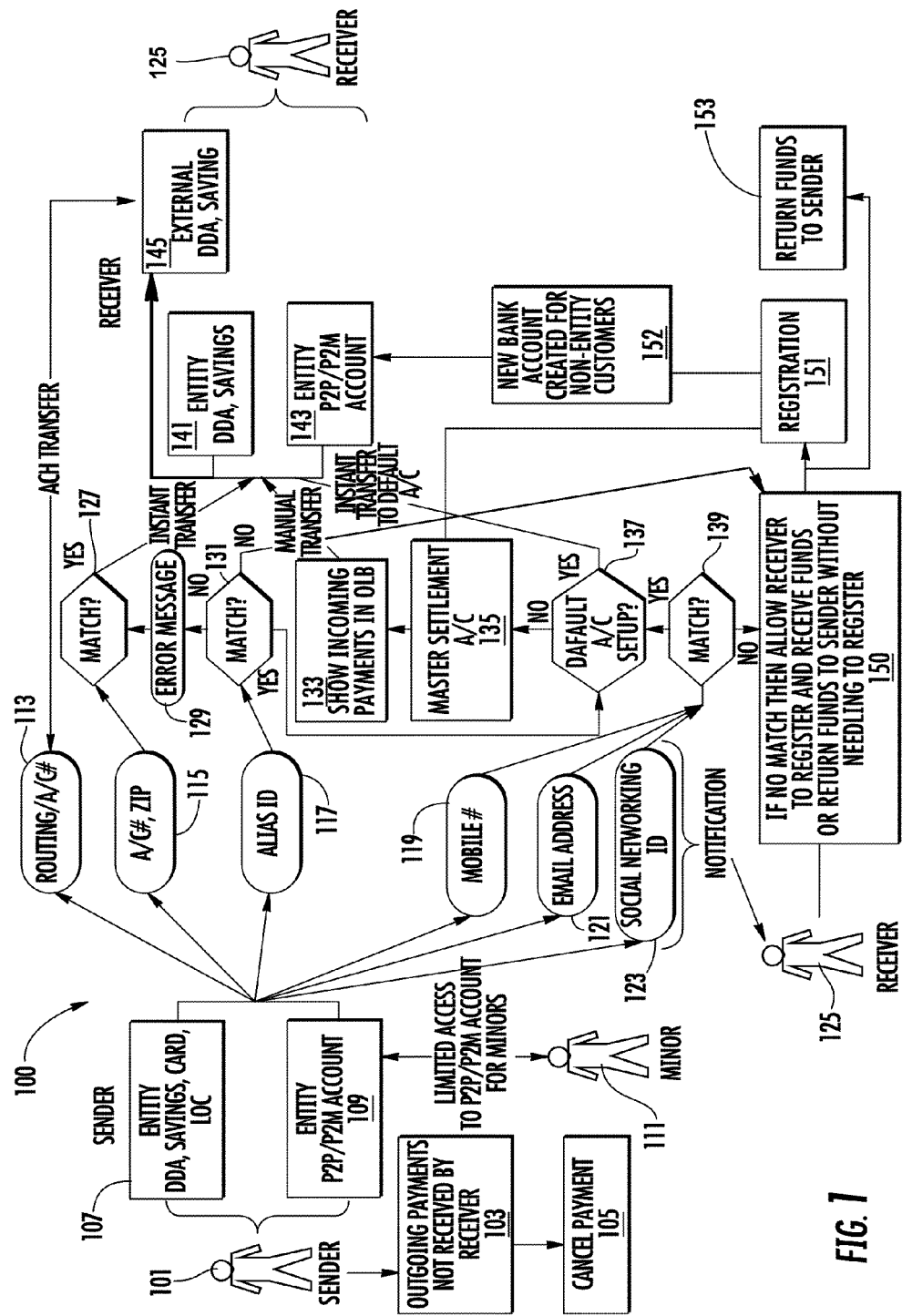
Figure 2:
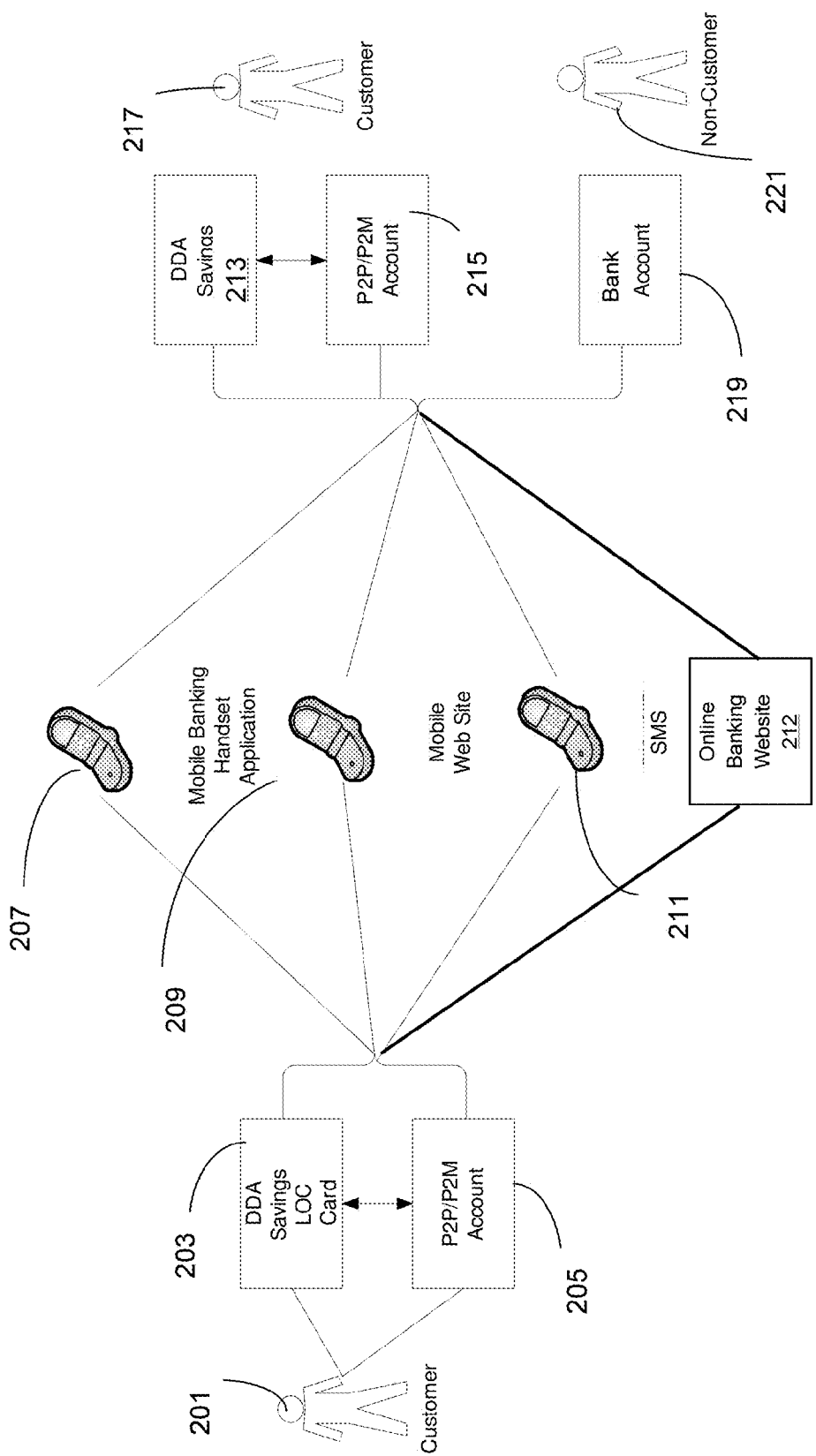
Figure 3:
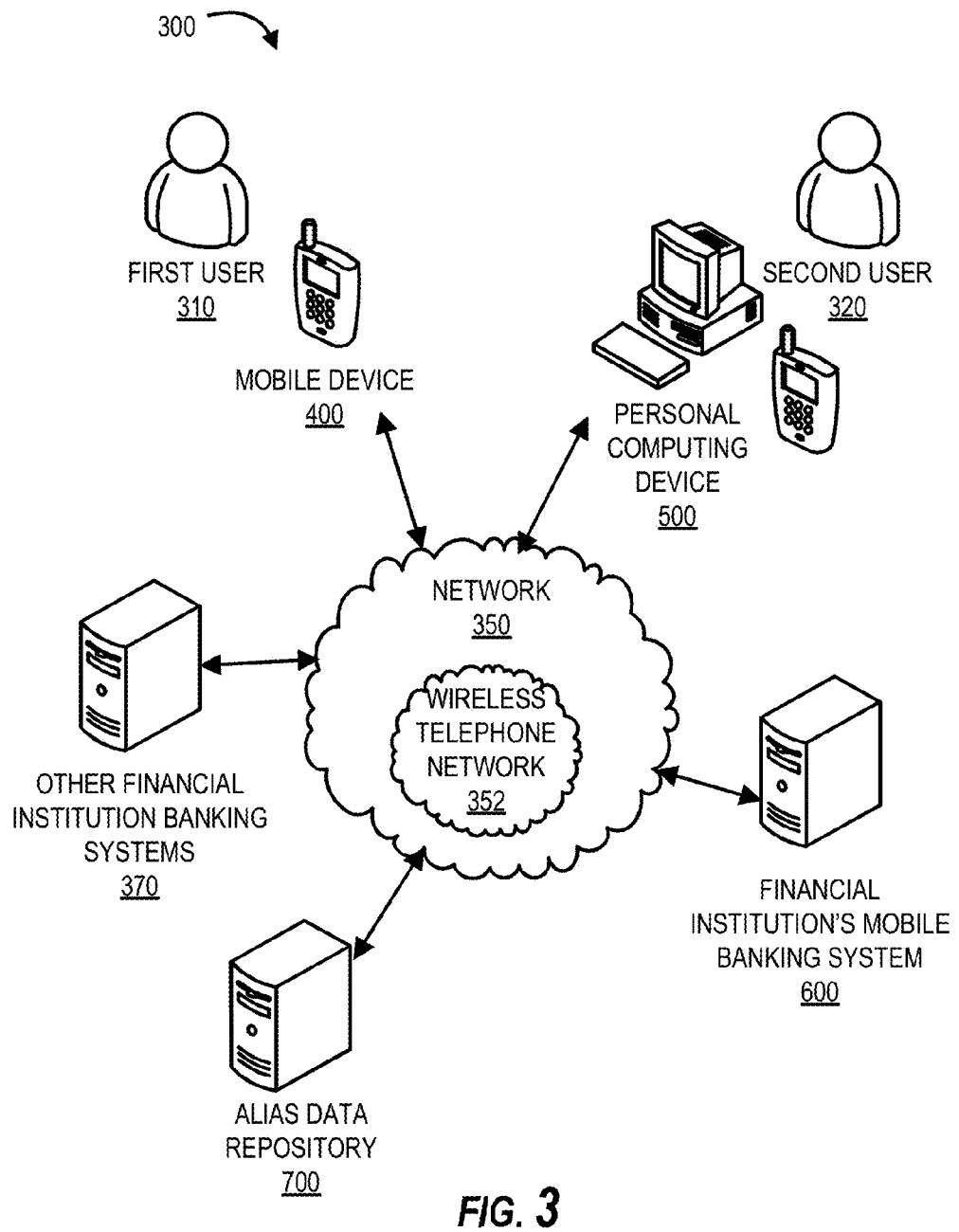
Figure 4:
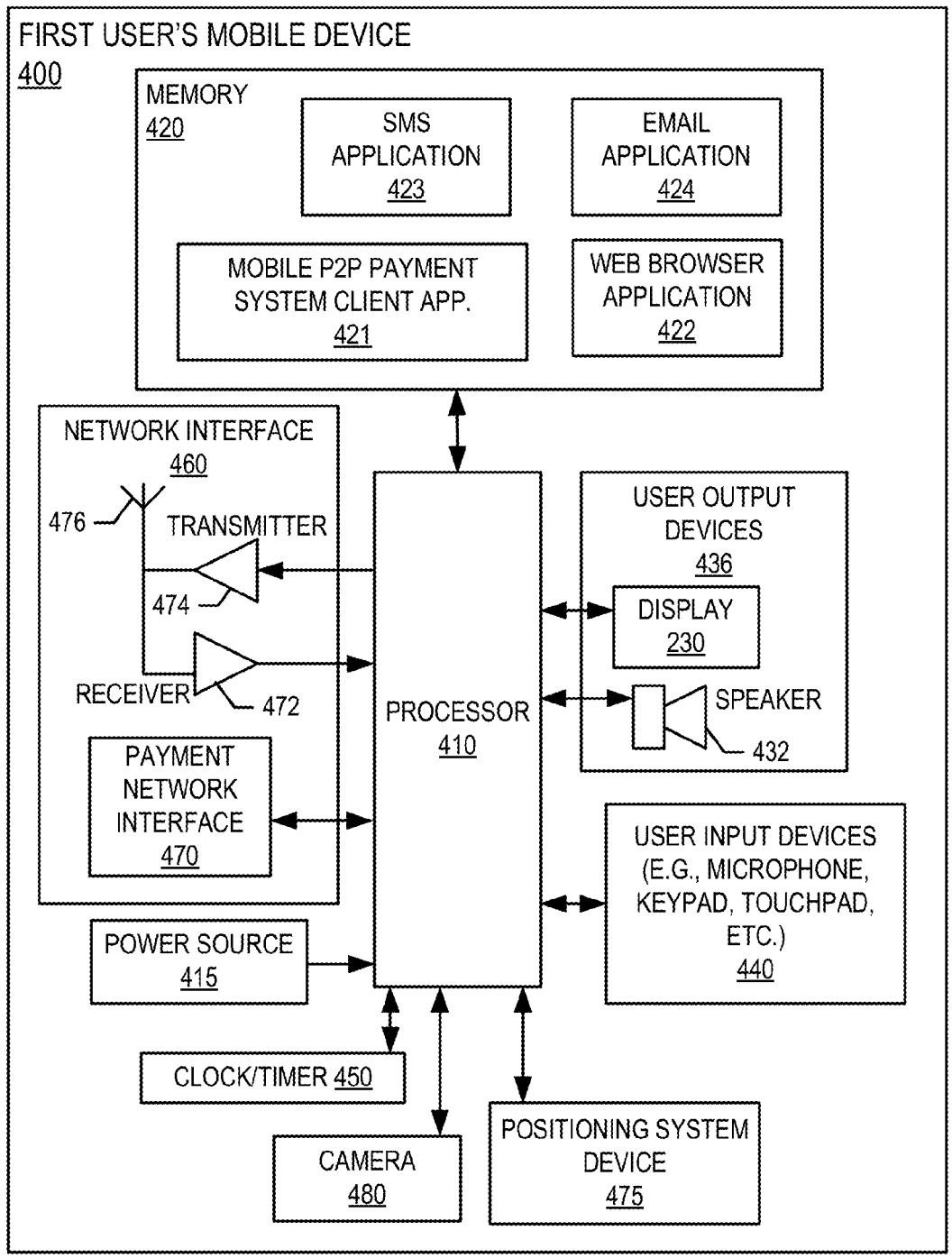
Figure 5:
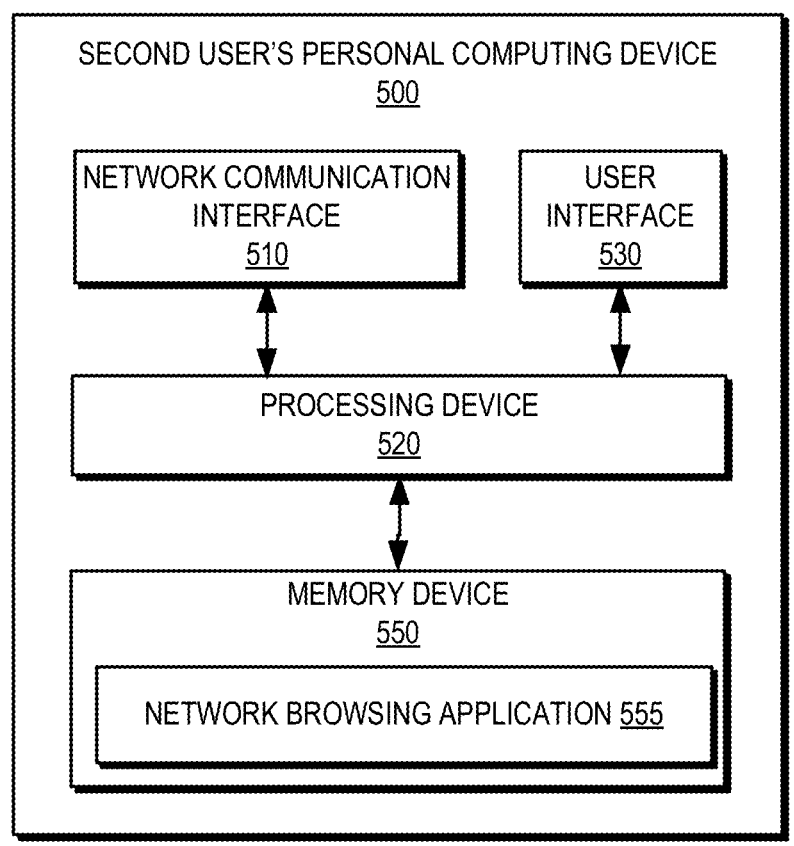
Figure 6:
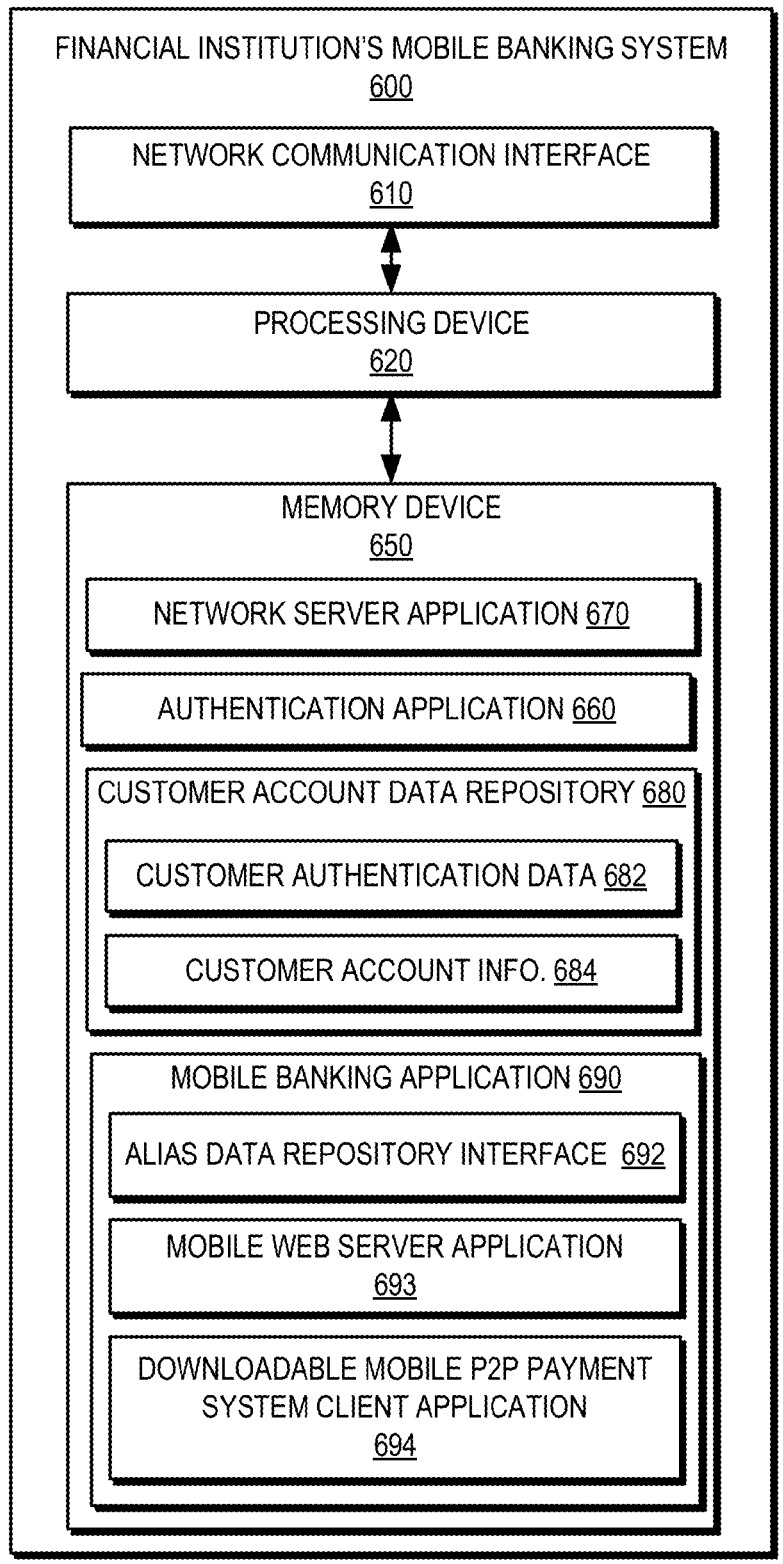
Figure 7:
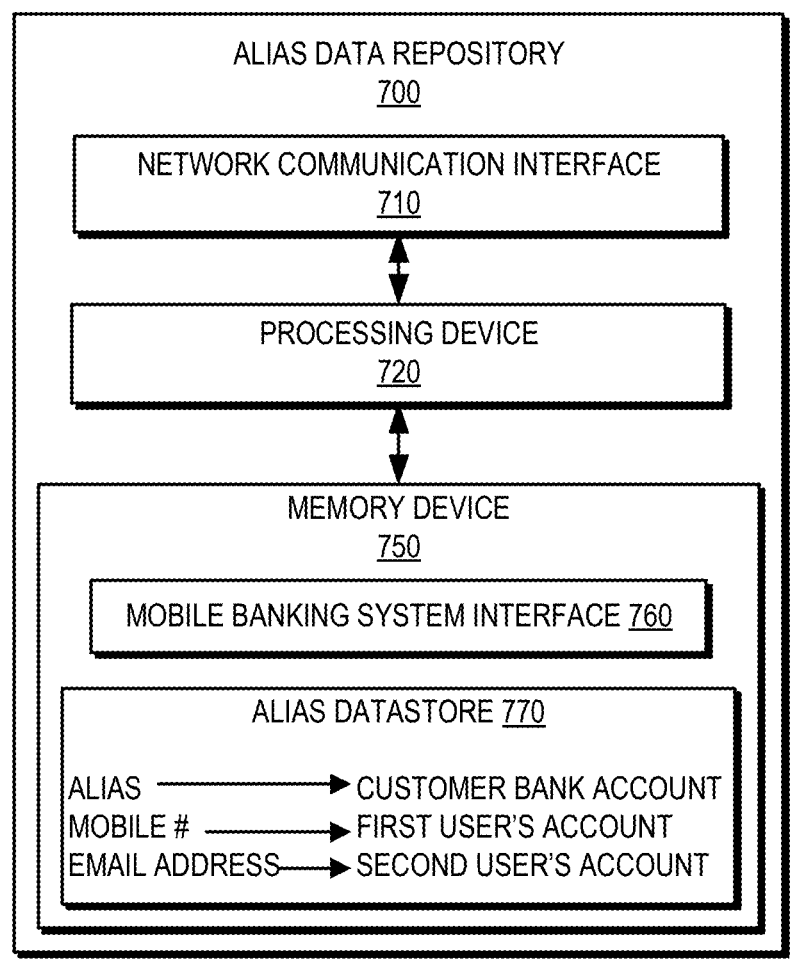
Figure 10A:
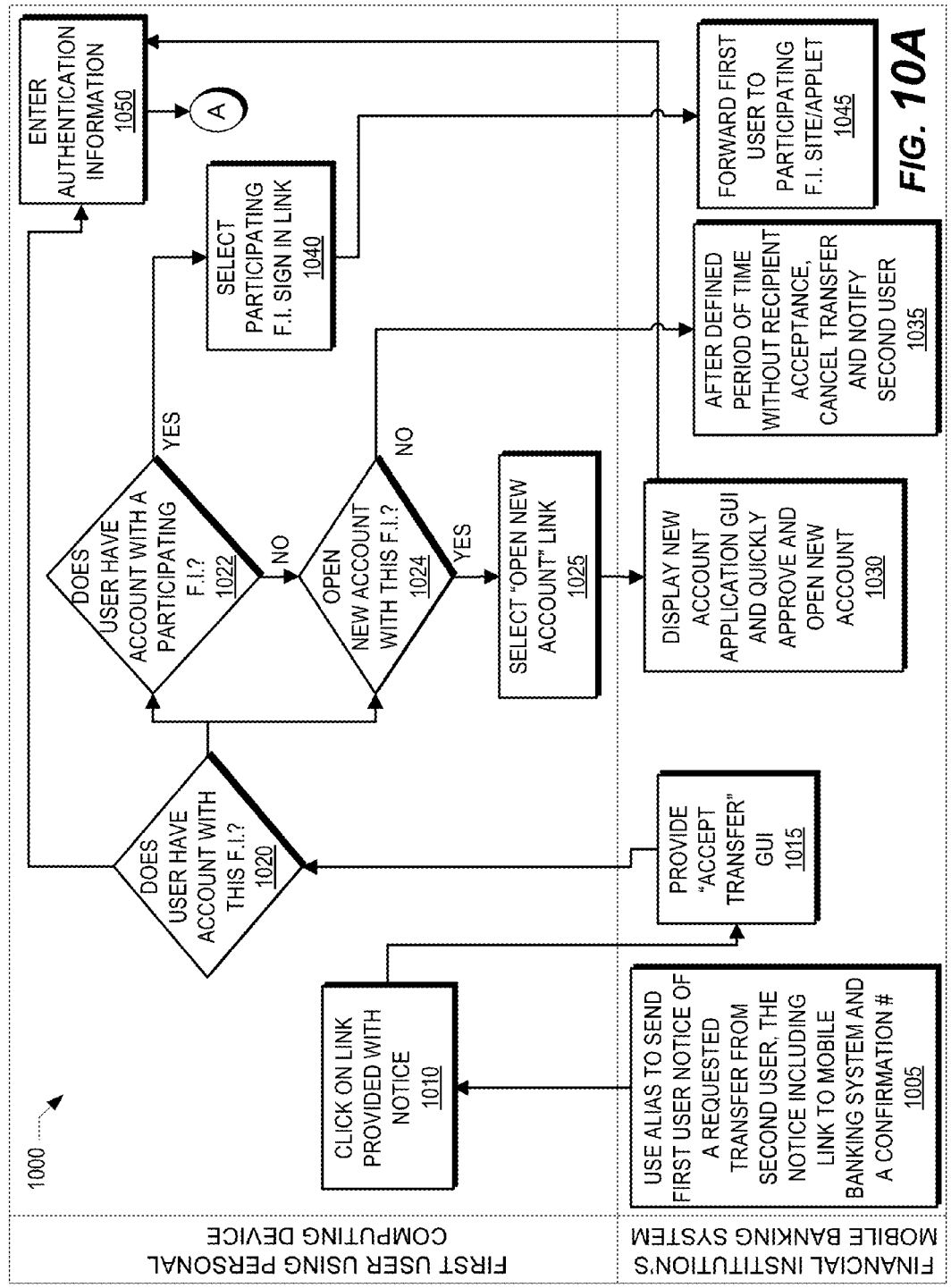
Figure 10B:
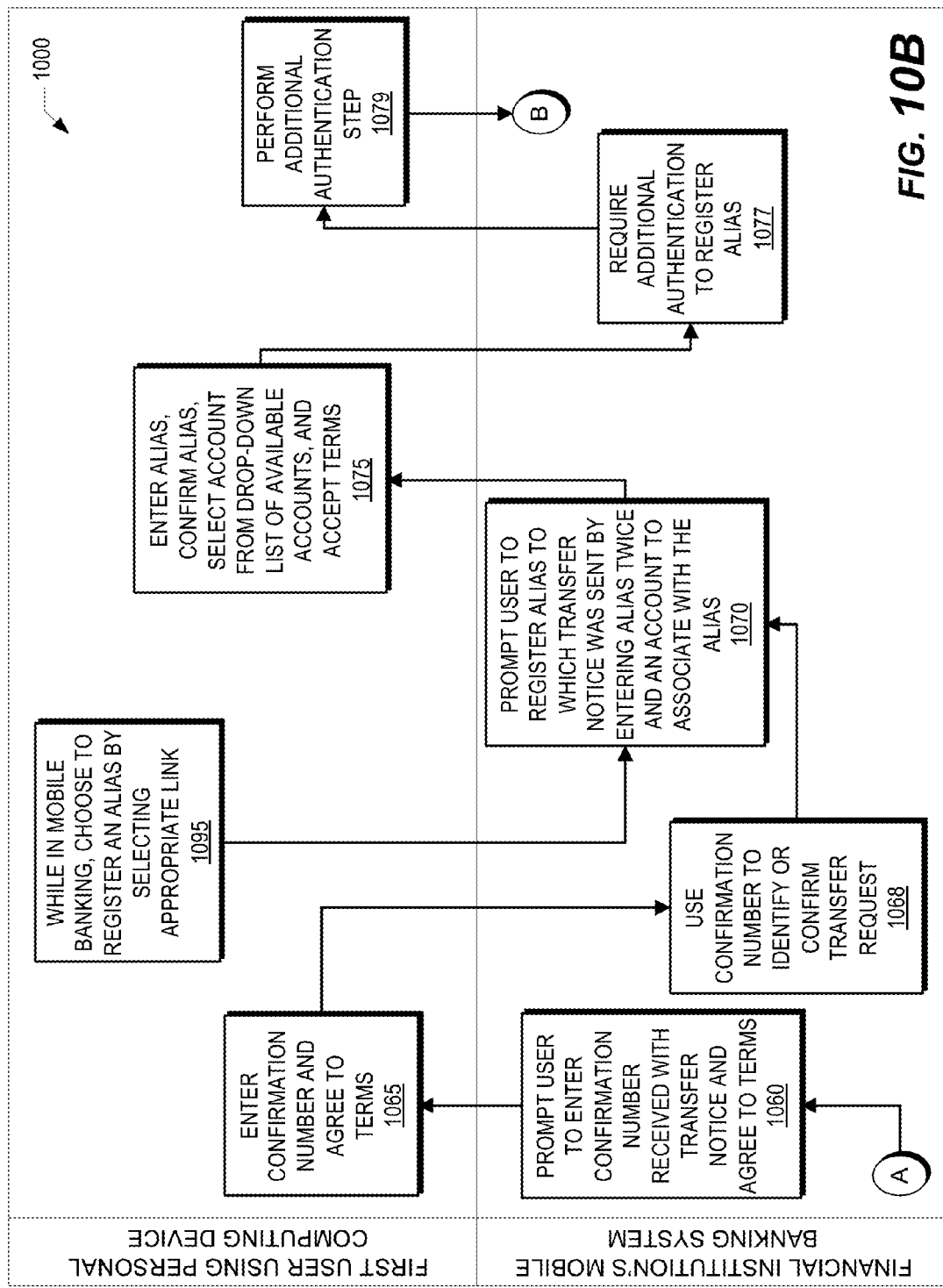
Figure 11:
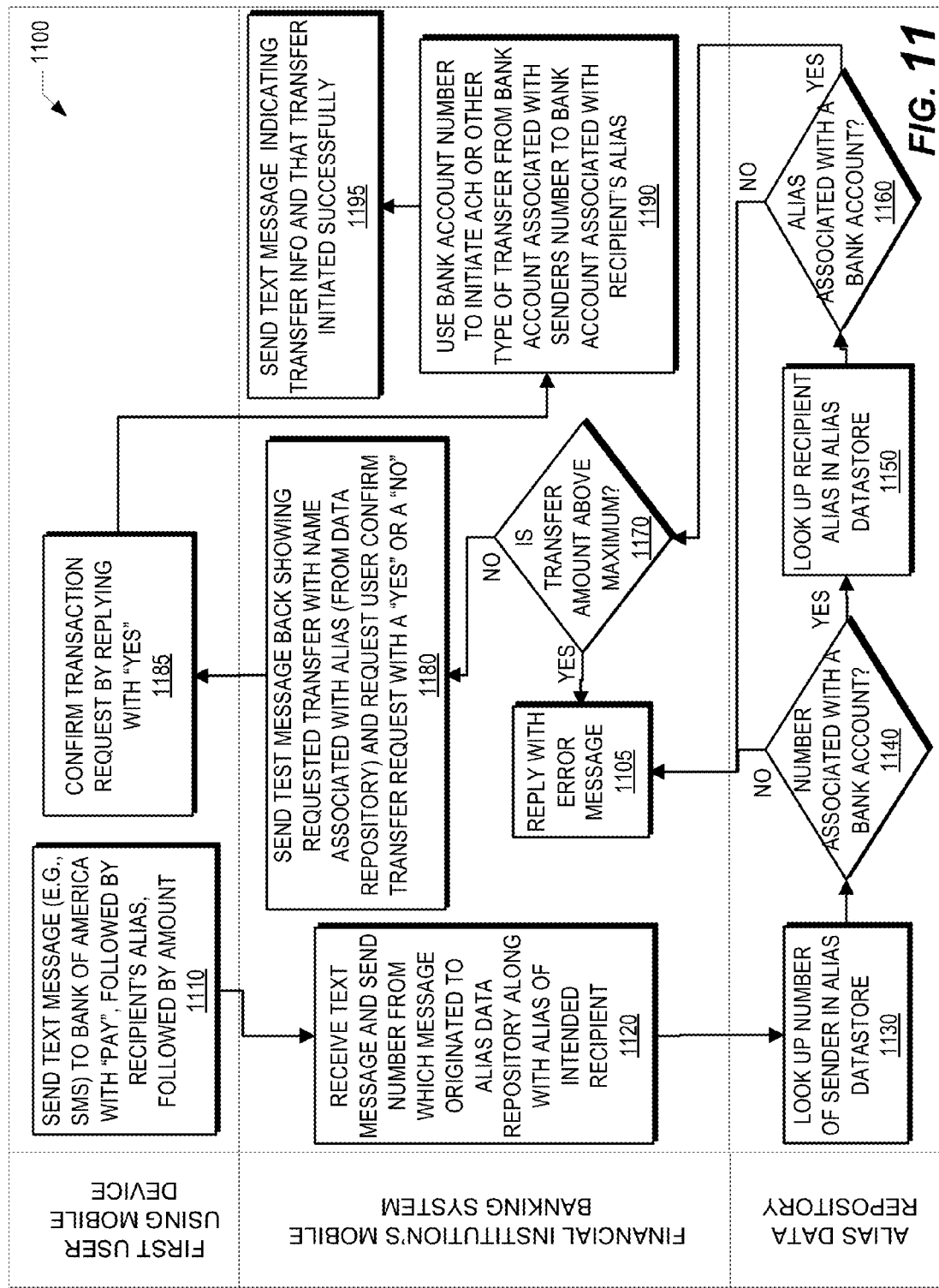
Figure 13:
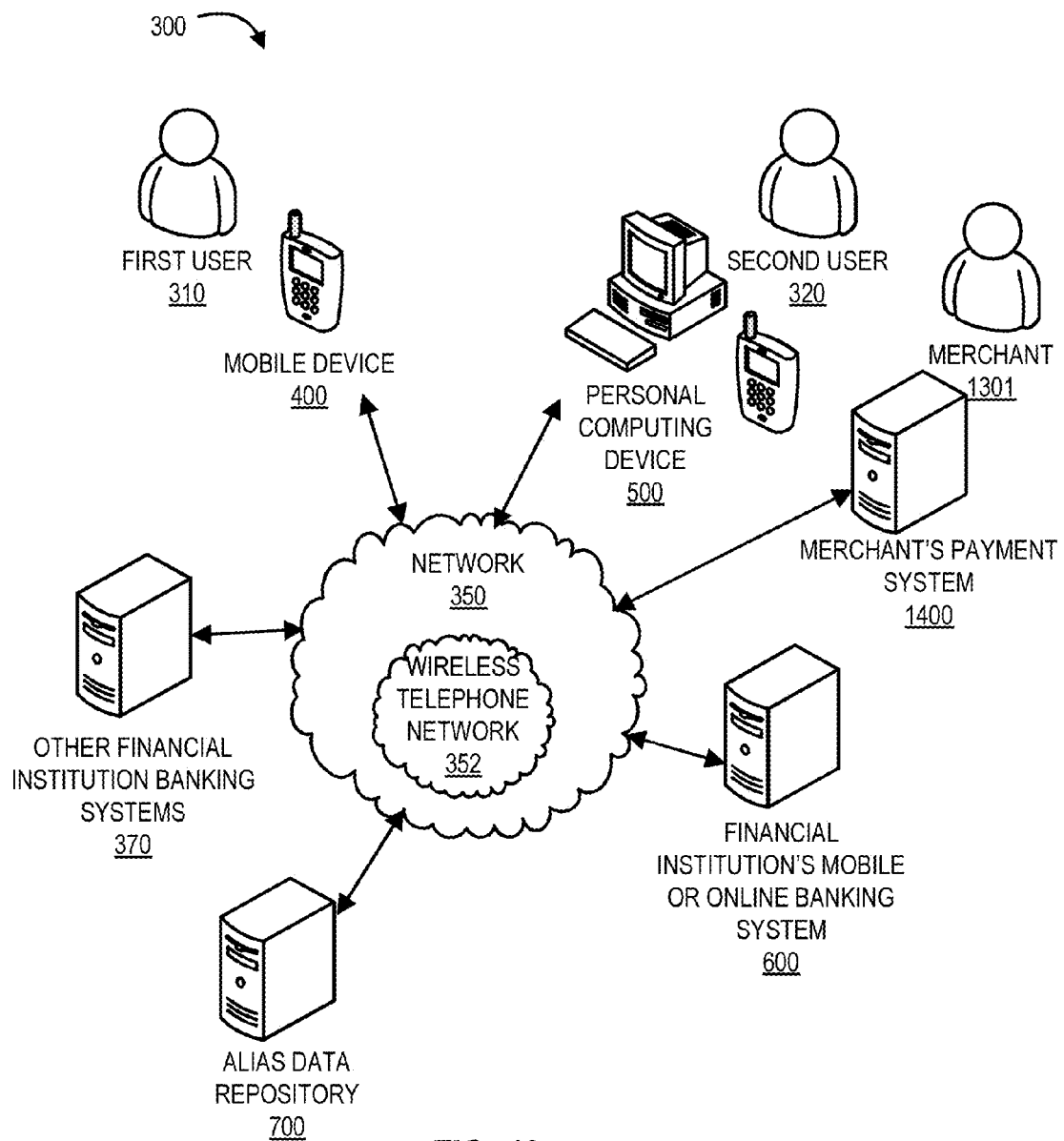
Figure 14:
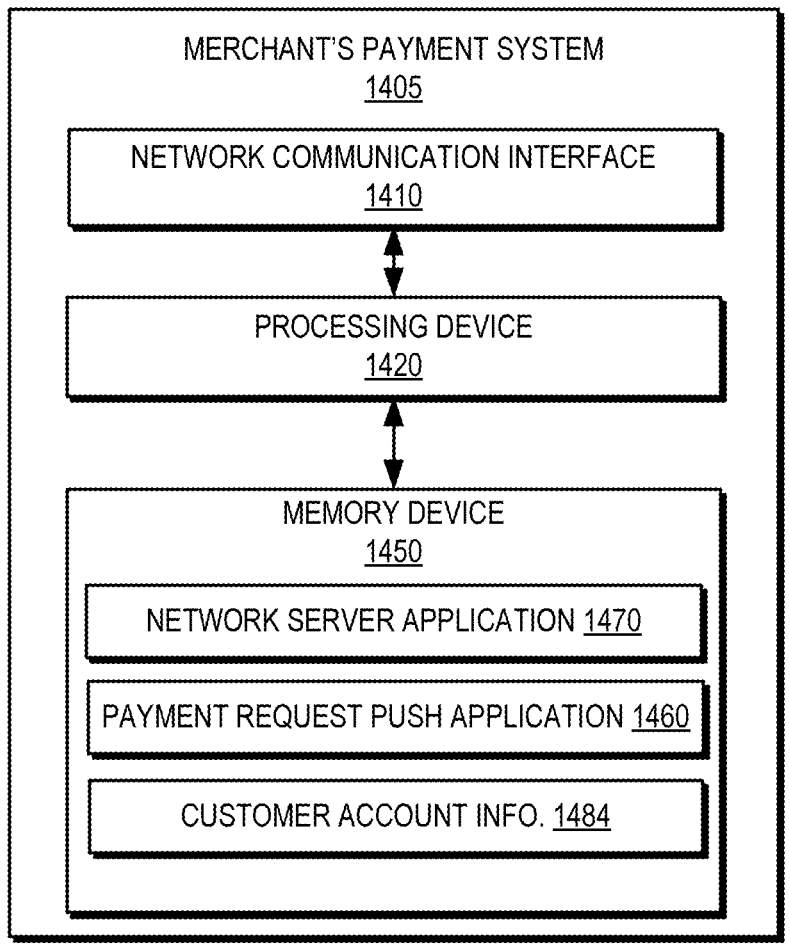
Figure 15:
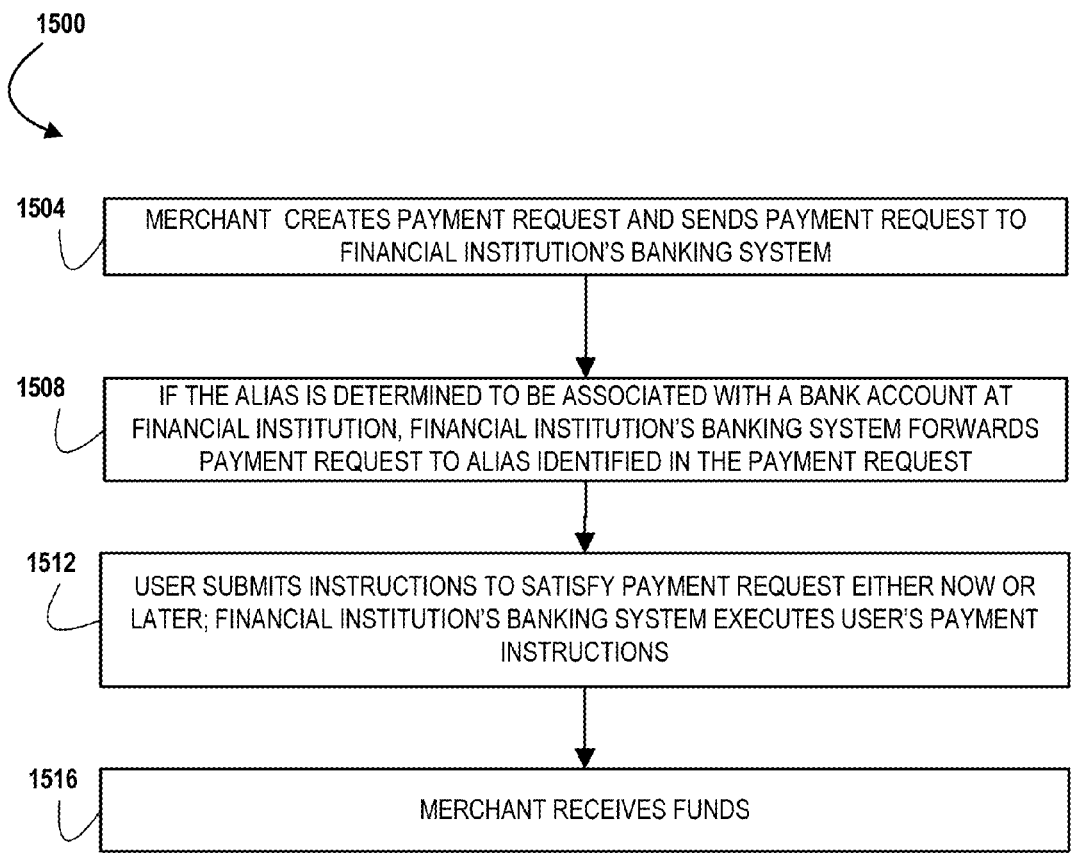

Having thus described embodiments of the invention in general terms, reference will now be made the accompanying drawings, wherein:

FIG. 1 is a combination flowchart and block diagram of a system and method for making P2P payments, in accordance with example embodiment of the invention;

FIG. 2 is a block diagram illustrating the various ways through which a customer may make P2P payments, in accordance with various embodiments of the invention;

FIG. 3 provides a block diagram illustrating a mobile banking P2P payment system and environment, in accordance with an embodiment of the invention;

FIG. 4 provides a block diagram illustrating the first user's mobile computing device of FIG. 3, in accordance with an embodiment of the invention;

FIG. 5 provides a block diagram illustrating the second user's personal computing device of FIG. 3, in accordance with an embodiment of the invention;

FIG. 6 provides a block diagram illustrating the financial institution's mobile banking system of FIG. 3, in accordance with an embodiment of the invention;

FIG. 7 provides a block diagram illustrating the alias data repository of FIG. 3, in accordance with an embodiment of the invention;

FIGS. 8A-8E provide flow charts illustrating a process for sending P2P payments, in accordance with embodiments of the invention;

FIGS. 9A-9G provide screenshots of a graphical user interface used during the process described in FIGS. 8A-8E, in accordance with embodiments of the invention;

FIGS. 10A-10C provide flow charts for receiving P2P payments, in accordance with embodiments of the invention, in accordance with embodiments of the invention;

FIG. 11 provides a flowchart for sending P2P payments via text message, in accordance with an embodiment of the invention;

FIGS. 12A-12D provide illustrations of a graphical user interface used during the process described in FIG. 11, in accordance with embodiments of the invention FIGS. 12A-12D provide illustrations of a graphical user interface used during the process described in FIG. 11, in accordance with embodiments of the invention;

FIG. 13 provides a block diagram illustrating a banking P2P payment system and environment, in accordance with other embodiments of the invention;

FIG. 14 provides a block diagram illustrating the merchant's payment system of FIG. 13, in accordance with embodiments of the invention;

FIG. 15 provides a flow chart illustrating a process for requesting a payment and satisfying a payment request, in accordance with other embodiments of the invention;

FIGS. 16A-16F provide illustrations of graphical user interfaces used during the process described in FIG. 15, in accordance with embodiments of the invention;

FIGS. 17A-17F provide illustrations of graphical user interfaces used during the process described in FIG. 15, in accordance with other embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for mobile banking integrated person-to-person (P2P) payments. Embodiments of the invention allow customers of a financial entity to make payments directly from their accounts, whether their accounts be checking, savings, line of credit, credit card, and/or other accounts, to a payment or transfer recipient, including financial entity customers and non-financial entity customers, without having to share any confidential account information and without having to know account information for the intended payment recipient. Embodiments of the invention also allow customers and non-customers to receive payments from others directly into their financial institution accounts without requiring the customer to share account information with the payment sender. It should be noted that some embodiments of the invention allow a customer to make payments to and/or receive payments from a merchant in the same way that a customer can make payments to and/or receive payments from another person. As such, as used herein, the phrase person-to-person (P2P) is intended to include person-to-merchant (P2M), merchant-to-merchant (M2M), and merchant-to-person (M2P) unless specifically stated otherwise. Embodiments of the present invention permit a sender to send money from the sender's financial institution account directly to the recipient's financial institution account using the alias of the recipient without the involvement of an intermediary or a third party. This allows for greater security as no party apart from the sender, the recipient, and the bank is ever a part of the transfer.

FIG. 1 is a combination block diagram and flowchart providing an overview of a system and method 100 for making P2P payments, in accordance with one or more embodiments of the invention. A customer 101 with an eligible account 107, e.g., checking (demand deposit account or "DDA"), savings, money market, line of credit, credit card, and the like, of a financial entity is be able to register and make use of this service. During the registration process, the customer 101 is able to set up an alias identifier (ID) 117 (or simply an "alias") that maps back to the customer's financial institution account. The alias 117 may be any unique identifier other than the customer's account number. Typically, the alias 117 is an identifier that friends, family, and/or other members of the public uniquely associate with the customer 101. For example, the alias 117 may be a mobile telephone number 119, an email address 121, a social networking ID 123, and/or the like. The embodiments of the invention described herein in the other figures generally permit the customer 101 to use either a mobile telephone number 119 or an email address 121 as the account alias, but it will be appreciated that, in view of this disclosure, other embodiments of the invention may allow use of other types of aliases.

The information provided by the customer 101 during registration of an alias may be verified to confirm that the customer 101 does have access to the mobile number 119, email address 121, social networking ID 123, or other alias 117 provided. For example, as described in greater detail below, the financial institution (or other entity that maintains a database of aliases and associates them with financial institution accounts) may send a communication to the customer 101 using the alias and require the customer 101 confirm access to the alias by responding to the notice in some way. For example, if the alias registered by the customer 101 is a mobile telephone number 119, the financial institution may send a text message to the mobile telephone number 119 with a code and then require that the customer 101 enter the code into a mobile banking or online banking application to confirm that the mobile telephone number is associated with the customer 101. Once the alias information is verified, then the alias is linked to one or more of the customer's financial institution accounts in a data repository maintained by the financial institution or some other entity that provides an alias registry service to the financial institution.

The customer 101 can also use embodiments of the invention to make payments to other entities, such as receiver 125, using an alias of the receiver 125. In some embodiments of the invention, the customer 101 is able to set preferences for accounts to be used for outgoing payments, and default account(s) for incoming payments. In some embodiments of the invention, the financial institution places limits (e.g., maximums and/or minimums) on how much money can be sent or received using P2P payment aliases, and such limits may be based on the sender, the receiver, whether the receiver is a customer of the financial institution or a partner financial institution, account history, credit ratings, customer status, whether the customer has registered the alias, and/or any other relevant information. In some embodiments, the customer 101 can also establish limits on P2P payments. For example, a customer 101 may want to set a maximum of $1000 for P2P payments where an alias is used for the recipient as opposed to an account number.

In some embodiments of the invention, the customer 101 may also have an option of opening a new P2P account 109 with the financial institution that the customer may use exclusively for making and/or receiving P2P payments. This financial entity P2P account 109 may be like any other account hosted at the financial entity and so money may be moved instantly into this account 109 through the regular mobile banking transfer process for moving money between a customer's accounts. This account 109 may be a type of checking account except that it may come with certain limitations, e.g., no checks, maximum balance limits, number of daily transactions or the like, and may be opened by customers by providing much less information as compared to a regular checking account. The financial entity may, at a minimum, require customers to provide certain information, such as name, address, date of birth, and social security number, in order to comply with Anti-Money Laundering (AML) regulations. Customers 101 of the financial entity may also have an option to set up P2P accounts 109 (i.e., sub-accounts) for minors 125, other dependents, or related entities. Customers 101 are able to access these accounts just like any of their other accounts. In addition, customers 101 are able to set up a mobile banking access ID for the minor 125 that the minor 125 may use to sign into mobile banking but have access only to the specific minor P2P account 109 set up for them. These P2P-specific accounts and sub-accounts are described in more detail in U.S. patent application Ser. No. 12/038,177 filed on Feb. 27, 2008 and entitled "Sub-Account Mechanism," which application was assigned to, or subject to an obligation to assign to, the same assignee of the present application at the time of filing of the present application and at the time of conception of the inventions described herein.

Referring again to FIG. 1, customers 101 of the financial entity are able to make payments to other people through any of a number of different methods. Payments may be made by a routing number/account number 113. Payments may also be made by providing an account number and an additional identifier, such as a zip code 115. If there is a match to an existing financial entity account in 127, then the funds are transferred instantly to that account. Else, an error message 129 may be generated.

In accordance with embodiments of the invention, payments may be made by providing an alias 117. In general, as described in greater detail below, the customer 101 initiates a P2P payment using an alias by communicating an alias 117 and an associated payment amount to the financial institution. The financial institution then accesses an alias database, or other type of data repository, to determine if the entered alias 117 has been registered by the alias holder and is, thereby, associated with a particular financial institution account. If the alias 117 does have a match to another customer in 131 or financial institution account of another customer 131, then the payment may be initiated to that person, as described in greater detail below. If there is no match, then either an error message 129 is generated or, if possible, the alias 117 may be used to contact the intended recipient 125 and allow this person to register the alias 117 and thereby associate the alias with a financial institution account. At any time, if outgoing payments or payment notifications are not received by a receiver (as represented by block 103), the payment may be canceled (as represented by block 105).

In some embodiments of the invention, an alias 117 may be associated with multiple financial institution accounts of the alias holder. In some such embodiments, the alias holder may be a able to establish a default account when registering the alias 117 or afterwards. Consequently, if a receiver 125 does have a default account for incoming payments in 137, then the funds may be transferred instantly to that account(s). If the receiver 125 has not set up a default account in 137 but the receiver 125 does have multiple accounts associated with the alias 117, then the funds may be moved to a master settlement account 135 and the receiver 125 may see the payment as an incoming payment within mobile banking 133. The receiver 125 may then be able to use the mobile banking application to move the funds instantly to any of the receiver's others accounts. In other embodiments, however, each alias 117 is associated only with one financial institution account and, therefore, steps 137 and 135 are not needed and the payment is deposited directly into the one financial institution account associated with the alias 117.

As further illustrated in FIG. 1, the alias 117 may be a mobile telephone number 119 and, as such, payment may be made by the customer 101 providing a mobile phone number 119 (the mobile telephone number 119 being the mobile telephone number of the intended payment recipient 125) along with an associated payment amount. This operation may perform exactly as described above for the alias 117 if there is a match in 139 on the mobile number. If there is no match in 139, then a text message may be sent to the mobile number 119 provided (as represented by block 150). If the receiver 125 of the message is an existing financial institution customer (or, in some embodiments, if the receiver 125 is a customer of a partner financial institution), then that person may be allowed to sign into their online or mobile banking account, register the phone number as illustrated by block 151 (thereby associating the phone number with a financial institution account for P2P payment purposes), and then receive funds similar to the process described above for the alias 117. If the receiver 125 is not a financial entity customer with an account eligible for receiving funds, then the receiver 125 may be given the option to sign up (as represented by block 152) for a financial institution account 141 or 143 at the financial institution or return funds to the sender (as represented by block 153).

As further illustrated in FIG. 1, the alias 117 may be an email address 121 and, as such, payment may be made by the customer 101 providing an email address 121 (the email address 121 being an email address of the intended payment recipient 125) along with an associated payment amount. This operation may perform exactly as described above for a mobile number 119 except that the notification message (with the registration or account opening option if appropriate) is sent to the email address 121 provided.

In some embodiments of the invention, payment may be made by providing a social networking ID 123, such as a unique ID associated with the receiver 125 on a particular social networking Internet site. In such a situation, the process operates in the same way as described above for mobile phone number 119 and email address 121 except the social networking platform may be used to notify the receiver based on the social networking ID 123 provided.

In all cases described above, if the receiver 125 is already a customer of the financial institution or a partner financial institution and has already registered the alias 117 provided by the sender 101, a text message, email, mobile banking notice, online banking notice, or other type of message may be sent to receiver 125 based on the alias 117 entered by the sender 101 or irrespective of information entered by sender if there is other contact information found in the receiver's profile, the notification notifying the receiver 125 of the payment. In some embodiments, the receiver 125 may be allowed to reject or re-route the payment. In some embodiments of the invention, the sender 101 is permitted to include a note to the recipient 125 along with the payment, such as a note explaining to the recipient what the purpose of the payment is for.

FIG. 2 is a block diagram illustrating the various ways through which a customer may make P2P payments in accordance with various embodiments of the invention. As illustrated, in some embodiments of the invention, a customer 201 who is signed up for the P2P payment service has the option to initiate P2P payments from a DDA, savings, line of credit, and/or credit card account 203 of the financial entity (and/or from a P2P-specific account 205 with the financial entity) through the financial entity's mobile banking website 209 or a mobile banking handset application 207 by providing any of the above-described alias information, e.g., phone number, email address, social networking ID, and/or other alias, along with a payment amount. In some embodiments of the invention, customers can alternatively or additionally initiate payments by sending a text message 211 to the financial entity, the text message including the receiver's phone number, email address, social networking ID, nickname, or other alias. In some embodiments, customers can alternatively or additionally use the financial institution's mobile banking website 212 to initiate a payment using an alias, as described in greater detail below with respect to FIGS. 3-12C. Whether via a mobile banking handset application 207, mobile website 209, short message service 211, or mobile banking website 212, a receiver 217 associated with the financial entity may receive funds at the receiver's financial institution account (e.g., DDA, savings, or credit account 213 or P2P-specific account 215). A receiver 221 not associated with the financial entity 221 may receive funds at the receiver's financial institution account 219 at another partner financial institution if the account is registered and associated with the alias and/or the receiver 221 may be prompted to register for the service and/or open an account with the financial institution in order to receive the payment from the sender 201.

It should be appreciated that embodiments of the invention described above permit an entity to send money to another entity even if the sending entity does not know any account information for the recipient entity and only knows a mobile telephone number or email address of the recipient entity. This can also result in better protection of personal account information. It should also be appreciated that some embodiments of the invention create a viral registration and/or account opening system that allows for customers of a financial institution send payments to anyone outside the financial entity using an alias. In such embodiments, the non-customers are contacted using the alias and they are allowed to quickly open and/or register an account with the financial institution in order to receive the funds from the sender.

As described above, FIGS. 1 and 2 provide an overview of the alias-type P2P payment system and process of embodiments of the invention. FIGS. 3-12C, described below, provide a more detailed description of some systems and methods of implementing embodiments the invention in a mobile banking environment. Specifically, embodiments of the invention described below disclose a user-friendly mobile banking interface and associated method that may be used by a financial institution to: (1) allow customers to send P2P payments using an alias of the intended recipient; (2) allow customers to register a customer's aliases and then receive alias-type P2P payments from others; and (3) allow customers to easily manage their P2P payments.

Mobile Banking P2P Payment System and Environment

FIG. 3 provides a block diagram illustrating a mobile banking P2P payment system and environment 300, in accordance with an embodiment of the invention. As illustrated in FIG. 3, the P2P payment environment 100 includes a first user 310 and a second user 320 where a first user wants to send funds to a second user. A user of the system may be a person, but may also be a business (e.g., a merchant) or any other entity capable of sending or receiving funds.

The environment 300 also includes a mobile device 400 and a personal computing device 500 for the first user 310 and second user 320, respectively. The personal computing device 500 may be any device that employs a processor and memory and can perform computing functions, such as a personal computer or a mobile device. As used herein, a "mobile device" 400 is any mobile communication device, such as a cellular telecommunications device (i.e., a cell phone or mobile phone), personal digital assistant (PDA), a mobile Internet accessing device, or other mobile device.

The mobile device 400 and the personal computing device 500 are configured to communicate over a network 350 with a financial institution's mobile banking system 600 and, in some cases, one or more other financial institution banking systems 370. The first user's mobile device 400, the second user's personal computing device 500, the financial institution's mobile banking system 600, an alias data repository 700, and any other participating financial institution's banking systems 370 are each described in greater detail below with reference to FIGS. 4-7. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352.

In general, a mobile device 400 is configured to connect with the network 300 to log the first user 310 into a mobile banking system 600. The mobile banking system 600 involves authentication of a first user in order to access the first user's account on the mobile banking system 600. For example, the mobile banking system 600 is a system where a first user 310 logs into his/her account such that the first user 310 or other entity can access data that is associated with the first user 310. For example, in one embodiment of the invention, the mobile system 600 is a mobile banking system maintained by a financial institution. In such an embodiment, the first user 310 can use the mobile device 400 to log into the mobile banking system to access the first user's mobile banking account. Logging into the mobile banking system 300 generally requires that the first user 310 authenticate his/her identity using a user name, a passcode, a cookie, a biometric identifier, a private key, a token, and/or another authentication mechanism that is provided by the first user 310 to the mobile banking system 600 via the mobile device 400.

The financial institution's mobile banking system 600 is in network communication with other devices, such as other financial institutions' transaction/banking systems 370, an alias data repository 700, and a personal computing device 500 that is configured to communicate with the network 350 to log a second user 320 into the mobile banking system 600. In one embodiment, the invention may provide an application download server such that software applications that support the mobile banking system 600 can be downloaded to the mobile device 400.

In some embodiments of the invention, the application download server is configured to be controlled and managed by one or more third-party data providers (not shown in FIG. 3) over the network 350. In other embodiments, the application download server is configured to be controlled and managed over the network 350 by the same entity that maintains the mobile banking system 600.

In some embodiments of the invention, the alias data repository 700 is configured to be controlled and managed by one or more third-party data providers (not shown) over the network 350. In other embodiments, the alias data repository 700 is configured to be controlled and managed over the network 350 by the same entity that maintains the financial institution's mobile banking system 600. In other embodiments, the alias data repository 700 is configured to be controlled and managed over the network 350 by the financial institution implementing the mobile payment system of the present invention. In still other embodiments, the alias data repository 700 is a part of the mobile banking system 600.

FIG. 4 provides a block diagram illustrating the consumer mobile device 400 of FIG. 3 in more detail, in accordance with embodiments of the invention. In one embodiment of the invention, the mobile device 400 is a mobile telephone. However, it should be understood, however, that a mobile telephone is merely illustrative of one type of mobile device 400 that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, gaming devices, laptop computers, cameras, video recorders, audio/video player, radio, GPS devices, or any combination of the aforementioned.

The mobile device 400 generally includes a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 350. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 352. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The network interface 460 may also include a payment network interface 470. The payment network interface 470 may include software, such as encryption software, and hardware, such as a modem, for communicating information to and/or from one or more devices on a network 350. For example, the mobile device 400 may be configured so that it can be used as a credit or debit card by, for example, wirelessly communicating account numbers or other authentication information to a terminal of the network 350.

As described above, the mobile device 400 has a user interface that is, like other user interfaces described herein, made up of user output devices 436 and/or user input devices 440. The user output devices 436 include a display 230 (e.g., a liquid crystal display or the like) and a speaker 432 or other audio device, which are operatively coupled to the processor 410. The user input devices 440, which allow the mobile device 400 to receive data from a user such as the first user 310, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a merchant or other location to determine that the consumer mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information.

The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the mobile device 400 described herein. For example, the memory 420 may include such applications as a conventional web browser application 422 and/or a mobile P2P payment system client application 421. These applications also typically provide a graphical user interface (GUI) on the display 230 that allows the first user 310 to communicate with the consumer mobile device 400, the mobile banking system 600, and/or other devices or systems. In one embodiment of the invention, when the first user 310 decides to enroll in the mobile banking program, the first user 310 downloads or otherwise obtains the mobile banking system client application from the mobile banking system 600 or from a distinct application server. In other embodiments of the invention, the first user 310 interacts with the mobile banking system 600 via the web browser application 422 in addition to, or instead of, the mobile P2P payment system client application 421.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information, and the like.

Referring now to FIG. 5, the personal computing device 500 associated with the second user 320 also includes various features, such as a network communication interface 510, a processing device 520, a user interface 530, and a memory device 550. The network communication interface 510 includes a device that allows the personal computing device 500 to communicate over the network 350 (shown in FIG. 3). In one embodiment of the invention, a network browsing application 555 provides for a user to establish network communication with a mobile banking system 600 (shown in FIG. 3) for the purpose of initiating mobile payment and/or registering an account and/or alias with the mobile payment system and/or receiving mobile payment, in accordance with embodiments of the invention.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a customer to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the first user 310 or second user 320 or output data to the first user 310 or second user 320. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating the mobile banking system 600 in greater detail, in accordance with an embodiment of the invention. As illustrated in FIG. 6, in one embodiment of the invention, the mobile banking system 600 includes a processing device 620 operatively coupled to a network communication interface 610 and a memory device 650. In certain embodiments, the mobile banking system 600 is operated by a first entity, such as a financial institution, while in other embodiments, the mobile banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the mobile banking system 600 described herein. For example, in one embodiment of the mobile banking system 600, the memory device 650 includes, but is not limited to, a network server application 670, an authentication application 660, a customer account data repository 680 which includes customer authentication data 680 and customer account information 684, a mobile banking application 690 which includes an alias data repository interface 692, a mobile web server application 693, a downloadable mobile P2P payment system client application 694 and other computer-executable instructions or other data. The computer-executable program code of the network server application 670, the authentication application 660, or the mobile banking application 690 may instruct the processing device 620 to perform certain logic, data-processing, and data-storing functions of the mobile banking system 600 described herein, as well as communication functions of the mobile banking system 600.

In one embodiment, the customer account data repository 680 includes customer authentication data 682 and customer account information 684. The network server application 670, the authentication application 660, and the mobile banking application 690 are configured to implement customer account information 684, the customer authentication data 682, and the alias data repository interface 692 when authenticating the customer 101 (or the first user 310) to the mobile banking system 600. The customer account information 684, the customer authentication data 682, and the alias data repository interface 692 are discussed in more detail in a later section.

As used herein, a "communication interface" generally includes a modem, server, transceiver, and/or other device for communicating with other devices on a network, and/or a user interface for communicating with one or more customers. Referring again to FIG. 6, the network communication interface 610 is a communication interface having one or more communication devices configured to communicate with one or more other devices on the network 350, such as the mobile device 400, the personal computing device 500, the mobile banking system 600, the other financial institution banking systems 370, and the alias data repository 700. The processing device 620 is configured to use the network communication interface 610 to transmit and/or receive data and/or commands to and/or from the other devices connected to the network 350.

FIG. 7 provides a block diagram illustrating an alias data repository 700, in accordance with an embodiment of the invention. In one embodiment of the invention, the alias data repository 700 is operated by a second entity that is a different or separate entity from the first entity (e.g., the financial institution) that, in one embodiment of the invention, implements the mobile banking system 600. In one embodiment, the alias data repository 700 could be part of the mobile banking system 600. In another embodiment, the alias data repository 700 is a distinct entity from the mobile banking system 600. As illustrated in FIG. 7, the alias data repository 700 generally includes, but is not limited to, a network communication interface 710, a processing device 720, and a memory device 750. The processing device 720 is operatively coupled to the network communication interface 710 and the memory device 750. In one embodiment of the alias data repository 700, the memory device 750 stores, but is not limited to, a mobile banking system interface 760 and an alias data store 770. The alias data store 770 stores data including, but not limited to, an alias for the customer's financial institution account, mobile number or email address for the first user's 310 account, and a mobile number and/or email address for the second user's 320 account. In one embodiment of the invention, both the mobile banking system interface 760 and the alias data store 770 may associate with applications having computer-executable program code that instructs the processing device 720 to operate the network communication interface 710 to perform certain communication functions involving the alias data store 770 described herein. In one embodiment, the computer-executable program code of an application associated with the alias data store 770 may also instruct the processing device 720 to perform certain logic, data processing, and data storing functions of the application associated with the alias data store 770 described herein. An alias, as defined in this invention, is not limited to just a mobile device number or an email address.

The network communication interface 710 is a communication interface having one or more communication devices configured to communicate with one or more other devices on the network 350. The processing device 720 is configured to use the network communication interface 710 to receive information from and/or provide information and commands to a mobile device 400, a personal computing device 500, other financial institution banking systems 370, the alias data repository 700, the mobile banking system 600 and/or other devices via the network 350. In some embodiments, the processing device 720 also uses the network communication interface 710 to access other devices on the network 350, such as one or more web servers of one or more third-party data providers. In some embodiments, one or more of the devices described herein may be operated by a second entity so that the third-party controls the various functions involving the alias data repository 700. For example, in one embodiment of the invention, although the mobile banking system 600 is operated by a first entity (e.g., a financial institution), a second entity operates the alias data repository 700 that stores the alias details for the customer's financial institution accounts and other information about customers.

As described above, the processing device 720 is configured to use the network communication interface 710 to gather data from the various data sources. The processing device 720 stores the data that it receives in the memory device 750. In this regard, in one embodiment of the invention, the memory device 750 includes datastores that include, for example: (1) aliases for customer financial institution account numbers and routing information, (2) information about sending and receiving users' mobile device numbers, email addresses, or other contact information, which may have been received from the mobile banking system 600; (3) a list of customer IDs or authentication data received from the mobile banking system 600; and/or (4) customer credentials (e.g., a customer ID) received from the customer's mobile device 400 or received from the mobile banking system 600 in response to the customer accessing the mobile banking system 600.

In one embodiment of the invention, an application server is provided to support various supporting systems on the network 350, including the wireless telephone network 352. The application server includes a network communication interface, a processing device, and a memory device. The network communication interface and the processing device are similar to the previously described network communication interface 610 and the processing device 620 previously described. For example, the processing device is operatively coupled to the network communication interface and the memory device. In one embodiment of the application server, the memory device includes a network browsing application having computer-executable program code that instructs the processing device to operate the network communication interface to perform certain communication functions of the application download server described herein.

As discussed above, in one embodiment of the invention, an application download server might be provided. The application download server may include a network communication interface, a processing device, and a memory device. The network communication interface and processing device are similar to the previously described network communication interface 610 and the processing device 620 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified customer's mobile device or personal computing device.

Mobile Banking P2P Payment Send Process and Interface

FIGS. 8A-8E provide flow charts illustrating a process 800 for sending P2P payments via alias using a mobile device, in accordance with an embodiment of the invention. FIGS. 8A-8E illustrate the flow chart in terms of "swim lanes" associated with entities which may perform the operations in each respective swim lane. The entities illustrated in the exemplary Figures are a financial institution's mobile banking system, a first user using a mobile device, an alias data repository, and a second user using a second personal computing device. However, it should be noted that other entities could also be involved and some embodiments of the invention may not be limited to the four entities illustrated in FIGS. 8A-8E. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

The process begins at block 802 of FIG. 8A where a financial institution's mobile banking system 600 invites a user to participate in a mobile P2P payment program. In one embodiment, the mobile banking system 600 only invites certain existing mobile banking users who fit certain criteria, including, but not limited to, pre-determined minimum account balance, number of years since the user first opened an account, and the like.

The process then moves to block 804 where the first user 310 using mobile computing device 400 accepts the invitation.

The process then moves to block 806 of FIG. 8A where the mobile banking system 600 presents to the first user the terms of the mobile P2P transfer feature that will govern the transfer of funds. In one embodiment, the first user can read the terms on the first user's mobile device 400, whereas in another embodiment, the first user can only read the terms on a personal computing device.

The process then moves to block 808 of FIG. 8A. The first user accepts the terms of the P2P service by activating an appropriate button on the mobile webpage.

The process then moves to block 810 of FIG. 8A where the mobile banking system 600 presents the first user with a downloadable client application.

The process then moves to block 812 of FIG. 8A where the first user 310 downloads the client application to the first user's mobile device 400.

The process then moves to block 814 of FIG. 8A where the first user 310 signs in to the mobile banking system 600 using the client application by providing appropriate authentication information.

The process then moves to block 816 of FIG. 8A where the mobile P2P payment system client application 694 on the mobile device 400 obtains authentication information from the first user and sends the authentication information to the mobile banking system 600.

The process then moves to block 818 of FIG. 8A where the mobile banking system 600 authenticates the first user 310 and communicates the authentication decision to the mobile P2P payment system client application 694.

The process then moves to block 820 of FIG. 8A where the mobile P2P payment system client application 694 authenticates the system to the first user 310. In one embodiment of the invention, the authentication is achieved using a web-based security system that provides mutual authentication between end-users and websites. In a challenge-response process, the first user has to identify himself or herself on a secure website by entering a username. Subsequently, the website authenticates itself to the first user by displaying an image and an accompanying phrase that the first user had previously configured. If the user recognizes this image and the accompanying phrase, the first user can authenticate himself or herself to the website by entering a password. Other embodiments of the invention may use other authentication systems.

The process then moves to block 825 of FIG. 8A where the mobile P2P payment system client application 694 provides a mobile banking menu including an option to transfer funds. A screenshot is illustrated in FIG. 9A(1). As shown in FIG. 9A(1), the mobile P2P payment system client application 694 displays a bank menu page on which the first user can navigate to an accounts function, a bill-paying function, a transfer funds function, or a location function. Further, the mobile P2P payment system client application 694 indicates to the first user that the first user is in a secure area of the mobile banking system 600. The bank menu page also has a text area where error messages are displayed. The mobile P2P payment system client application 694 always allows users to sign out from their accounts on any mobile webpage by providing an appropriate hyperlink or button.

Figure 8B:
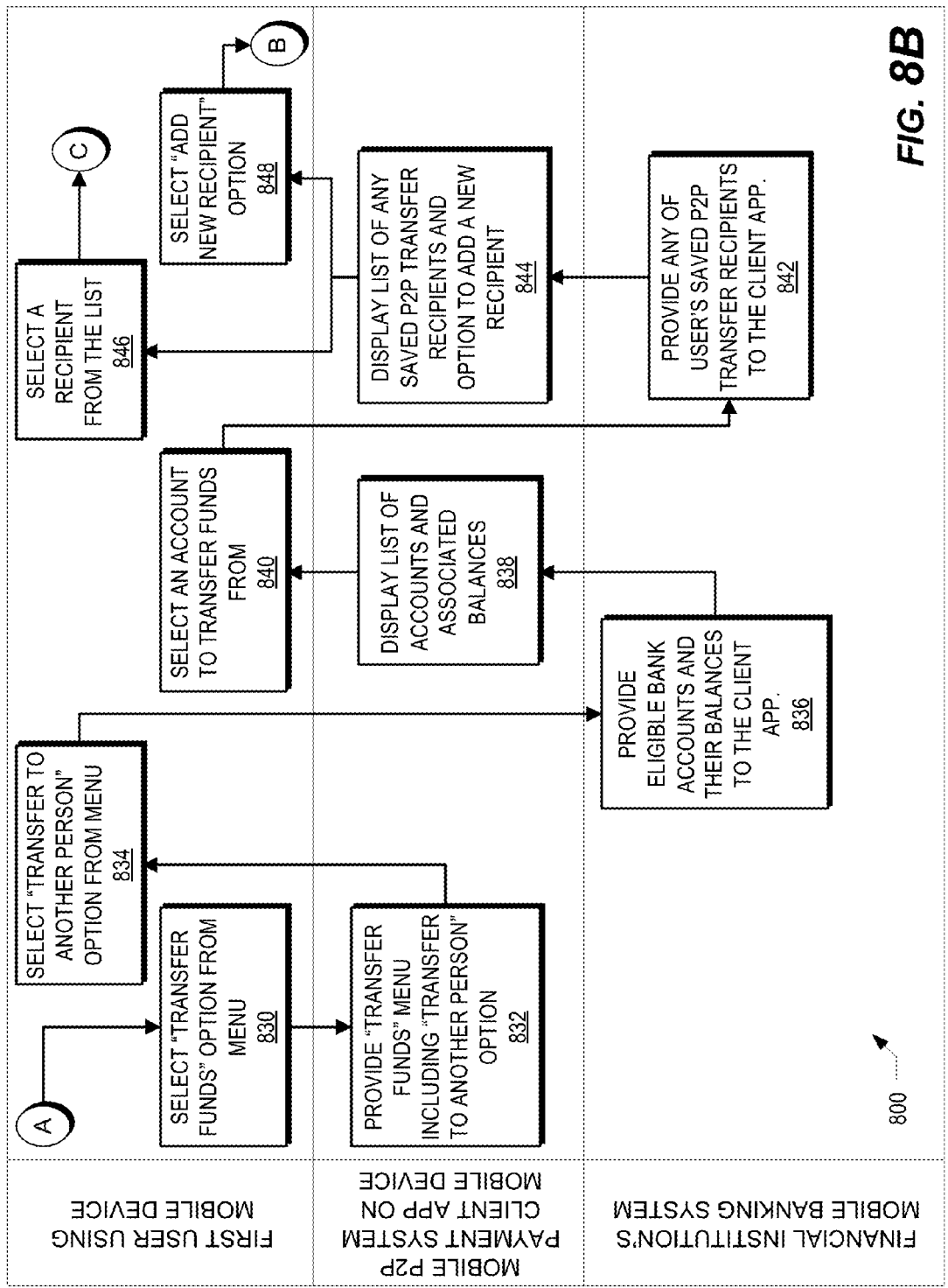
Figure 9A:
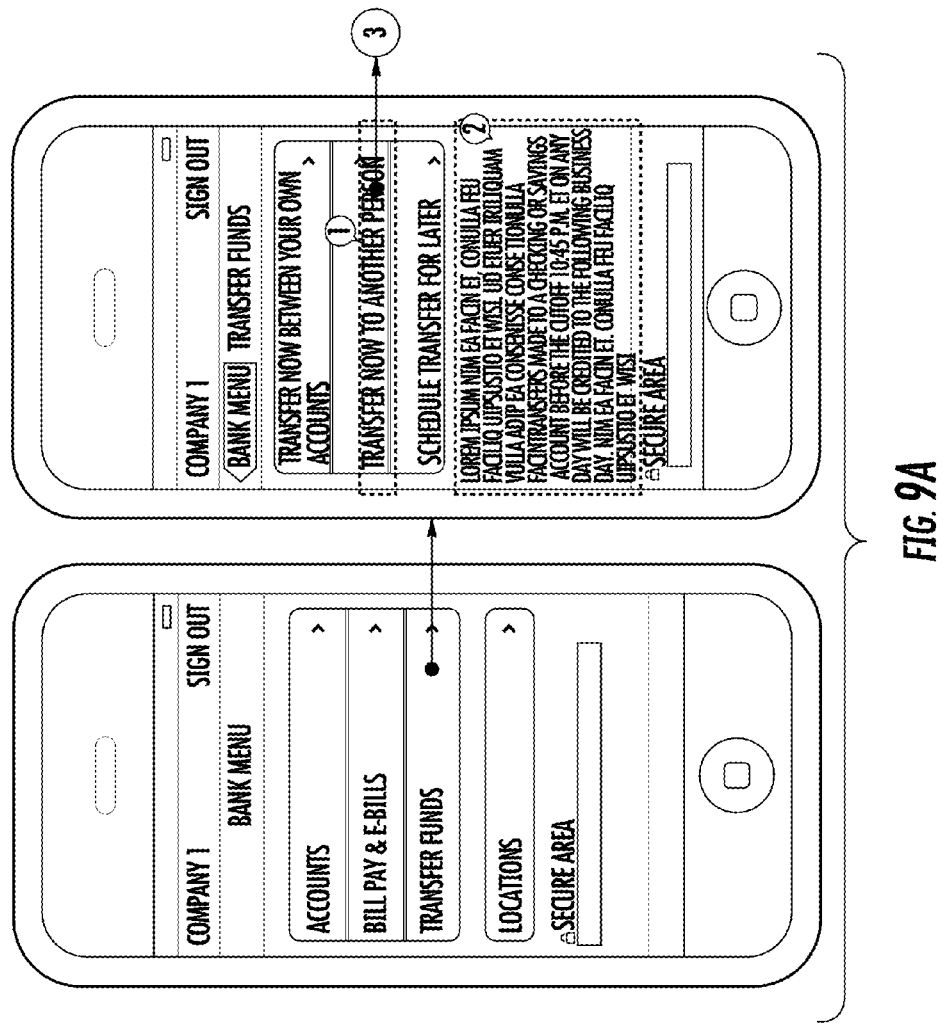

The process then moves to block 830 of FIG. 8B where the first user 310 selects the transfer funds option from the menu displayed in FIG. 9A(1).

The process then moves to block 832 of FIG. 8B where the mobile P2P payment system client application 694 provides a transfer funds menu that includes an option to transfer to another person. This can be seen in FIG. 9A(2), where based on the user activating the transfer funds function on the screenshot of FIG. 9A(1), the mobile P2P payment system client application 694 displays three options for the first user including an option to transfer between the first user's own accounts, an option to transfer to another person, and an option to schedule a transfer for later execution. In one embodiment, each of these three options are hyperlinks that are linked to mobile payment system 600. The mobile P2P payment system client application 694 indicates to the first user using a static textbox that any transfers made to an account before a cutoff time on any day will be credited to that account; otherwise the transfer will credited on the following business day.

The process then moves to block 834 of FIG. 8B where the first user 310 selects the option to transfer to another person from the transfer funds menu.

The process then moves to block 836 of FIG. 8B where the mobile banking system 600 provides eligible financial institution accounts and their balances to the mobile P2P payment system client application 694.

Figure 9B:
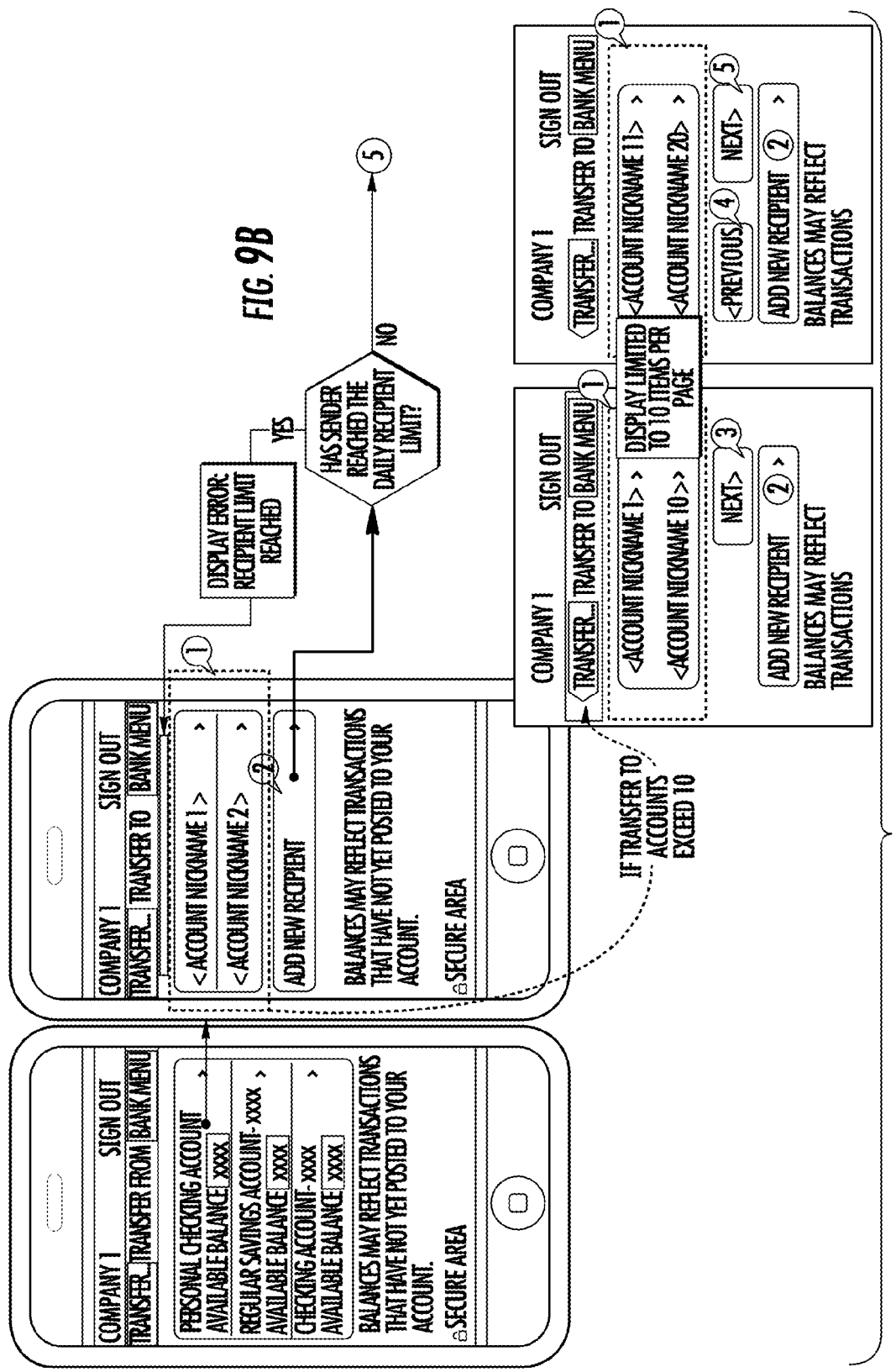

The process then moves to block 838 of FIG. 8B where the mobile P2P payment system client application 694 displays a list of eligible financial institution accounts that can participate in the mobile P2P transfer as well as their associated balances. A relevant screenshot is shown in FIG. 9B(3) where the mobile P2P payment system client application 694 displays the eligible accounts and their balances. The mobile P2P payment system client application 694 also indicates to the first user that the balances may reflect transactions that have not yet been posted to the first user's account. In the illustrated example of FIG. 9B(3), a personal checking account, a regular savings account and a another checking account and their respective balances are depicted.

The process then moves to block 840 of FIG. 8B where the first user 310 can select an account to transfer funds from.

The process then moves to block 842 of FIG. 8B where the mobile banking system 600 provides any of first user's saved P2P transfer recipients to the mobile P2P payment system client application 694.

The process then moves to block 844 of FIG. 8B where the mobile P2P payment system client application 694 displays a list of any saved P2P transfer-to accounts or recipients and an option to add a new recipient. A screenshot of this list is shown in FIG. 9B(4) where any saved P2P transfer recipients are visible in the region displayed as "Account Nickname 1" and "Account Nickname 2." Activating any particular transfer-to account that is in the name of or otherwise associated with the first user will take the first user to an account details page for that particular account. Activating any particular transfer-to account not in the name of or associated with by the first user (i.e., another user's account) will not take the first user to an account details page for that particular account. In one embodiment, the first user cannot see the balance of a transfer-to account not in the name of or associated with the first user. FIG. 9B(4) also displays a hyperlink to add a new transfer recipient. This link is only available if the first user has agreed to the terms and conditions page on the first user's mobile banking account. In one embodiment, the mobile P2P payment system client application 694 can only display a first pre-determined number of transfer-to accounts or recipients per page. Therefore as shown in FIG. 9B(4a), if the number of transfer-to accounts are greater than a first pre-determined number, then a first user has to activate the next button to choose other recipients if the user wants to choose a recipient who is not in the initial pre-determined displayed list of recipients. If the number of transfer-to accounts or recipients are greater than a second higher pre-determined number, then as shown in FIG. 9B(4b), the mobile P2P payment system client application 694 provides the first user with the next button and the previous button to navigate between groups of recipients. If the number of transfer-to accounts or recipients is greater than a first pre-determined number but smaller than a second higher pre-determined number, then the mobile P2P payment system client application 694 provides the first user with a previous button but not a next button. In one embodiment of the invention, the first pre-determined number is 10 and the second higher pre-determined number is 20.

The process then moves to block 846 of FIG. 8B where the first user 310 can select a recipient from the list to participate in the P2P transfer by activating the link associated with a particular recipient. If the user selects an existing recipient, then the mobile P2P payment system client application 694 presents to the user the transfer GUI of block 860 (FIG. 8C) that is described later. Alternatively, the process can move to block 848 of FIG. 8B where the first user adds a new recipient by activating the link to add a new recipient. In one embodiment, in which the user is limited to adding a predetermined number of new recipients in a daily period, if the first user has reached the pre-determined daily recipient limit, the mobile P2P payment system client application 694 displays an error message on an area of the mobile webpage displayed in FIG. 9B(4).

Figure 8C:
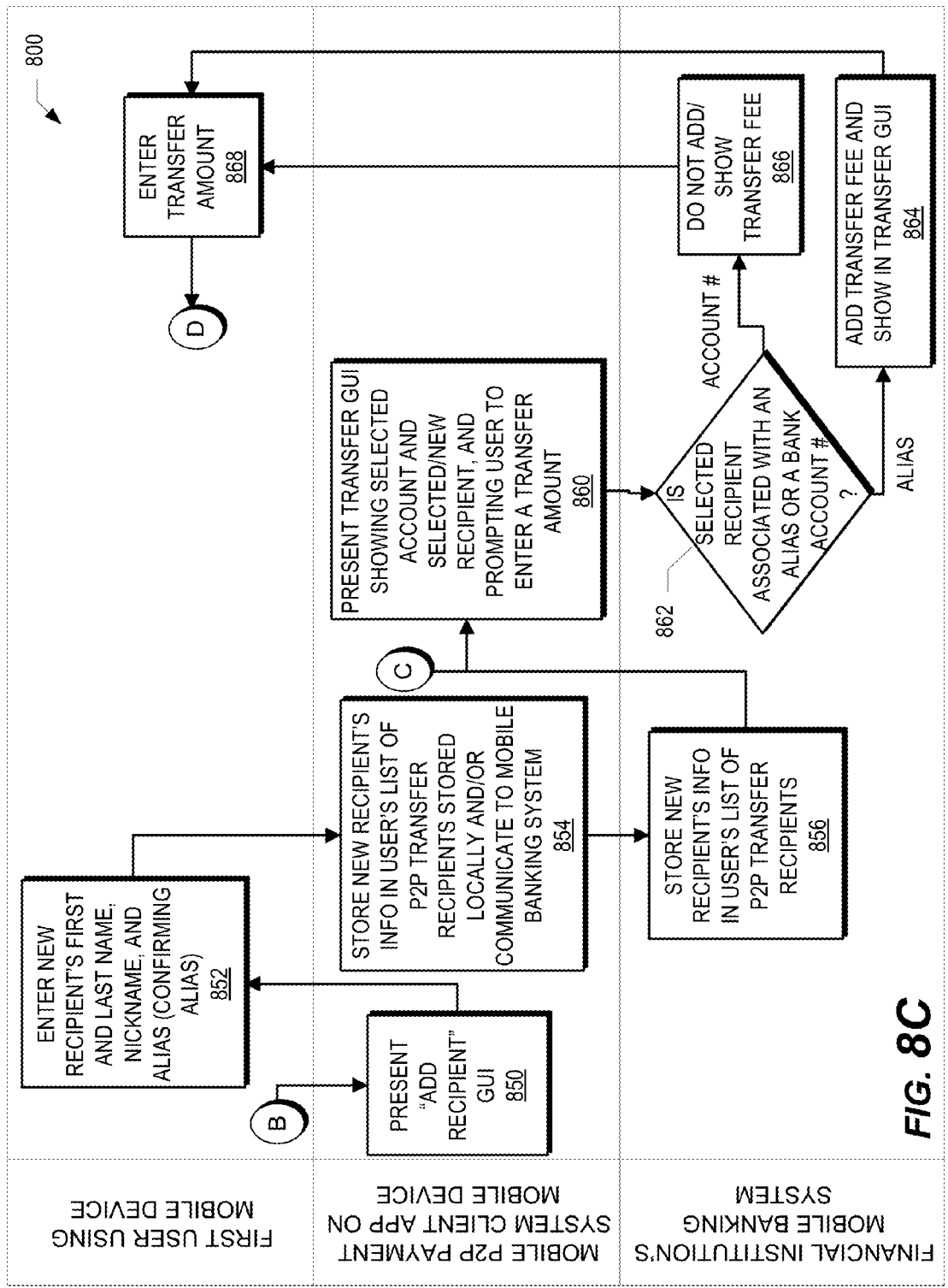
Figure 9C:
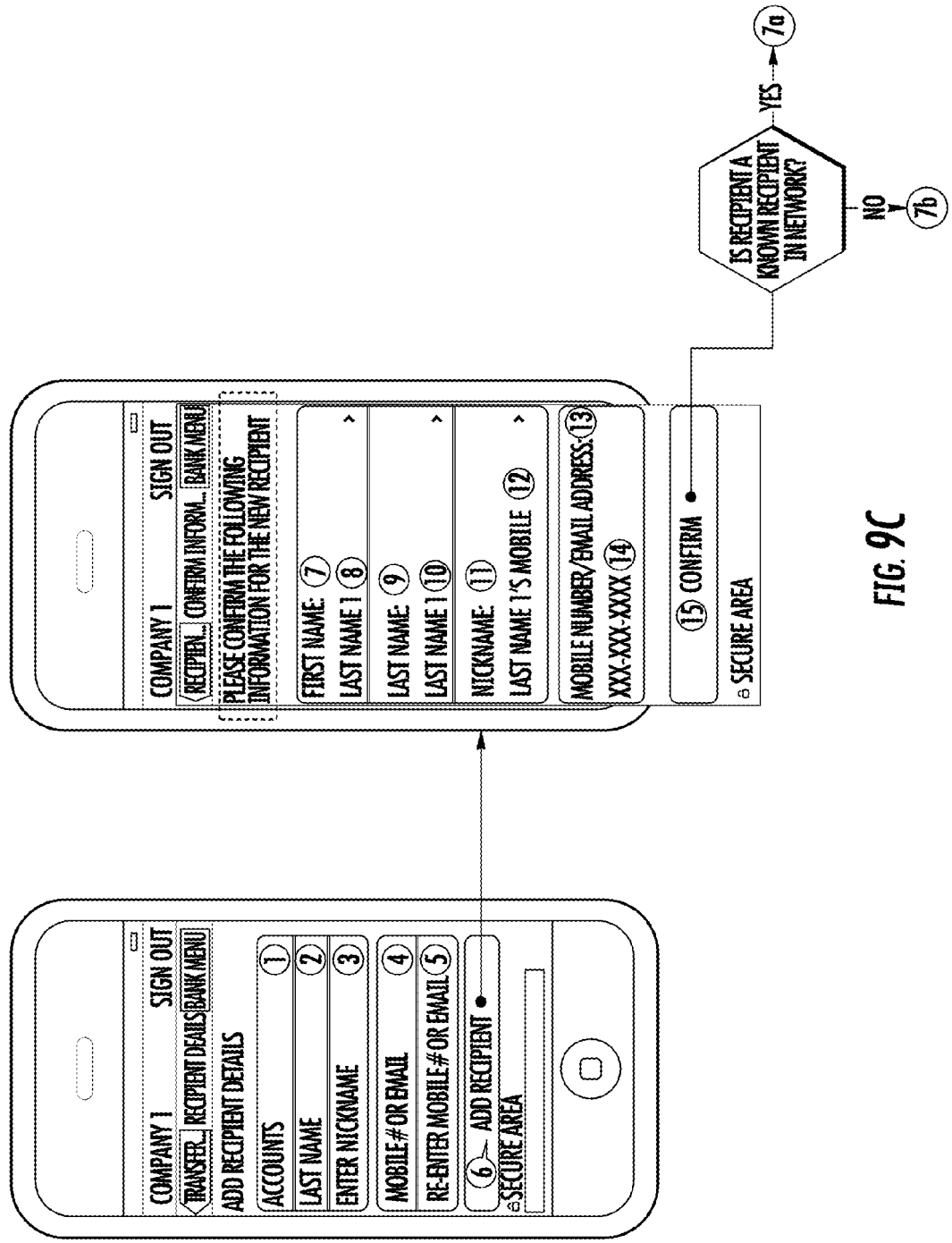

The process then moves to block 850 of FIG. 8C where the mobile P2P payment system client application 694 presents to the first user a GUI to add a new recipient. A screenshot of this GUI is shown in FIG. 9C. As shown in FIG. 9C(5), the mobile P2P payment system client application 694 presents an input field to enter the recipient's first name, an input field to enter the recipient's last name, an input field to enter a nickname associated with the recipient as chosen by the first user, a first input field to enter an alias, and a second input field to re-enter the alias which is checked against the alias entered into the first input field to verify that both aliases match. In one embodiment, the alias can be, but is not limited to, a mobile device number or an email address. The GUI also presents the user with a button to add the new recipient. The process then moves to block 852 of FIG. 8C where the first user enters the new recipient's first name, last name, nickname, and alias, along with re-entering the alias and activating the button the add the recipient. As shown in FIG. 9C(6), a pre-confirmation page is now displayed where the mobile P2P payment system client application 694 asks the first user to confirm the details of the recipient by activating the confirm button. In one embodiment, the complete set of characters comprising the alias are not displayed on the pre-confirmation page. By activating any of the entries entered by the first user, the first user can be taken back to the mobile webpage for adding recipient details. For instance, if the first user activates the first name that is displayed on the pre-confirmation page, a hyperlink embedded into the text allows the first user to return to the pre-confirmation page FIG. 9C(5) for editing the first name.

Once the first user activates the confirm button, the process moves to block 854 of FIG. 8C where the mobile P2P payment system client application 694 locally stores the new recipient's information in the first user's list of P2P transfer recipients and/or communicated to the mobile banking system 600.

The process then moves to block 856 of FIG. 8C where the mobile banking system 600 stores the new recipient's information in the first user's list of P2P transfer recipients.

Figure 9D:
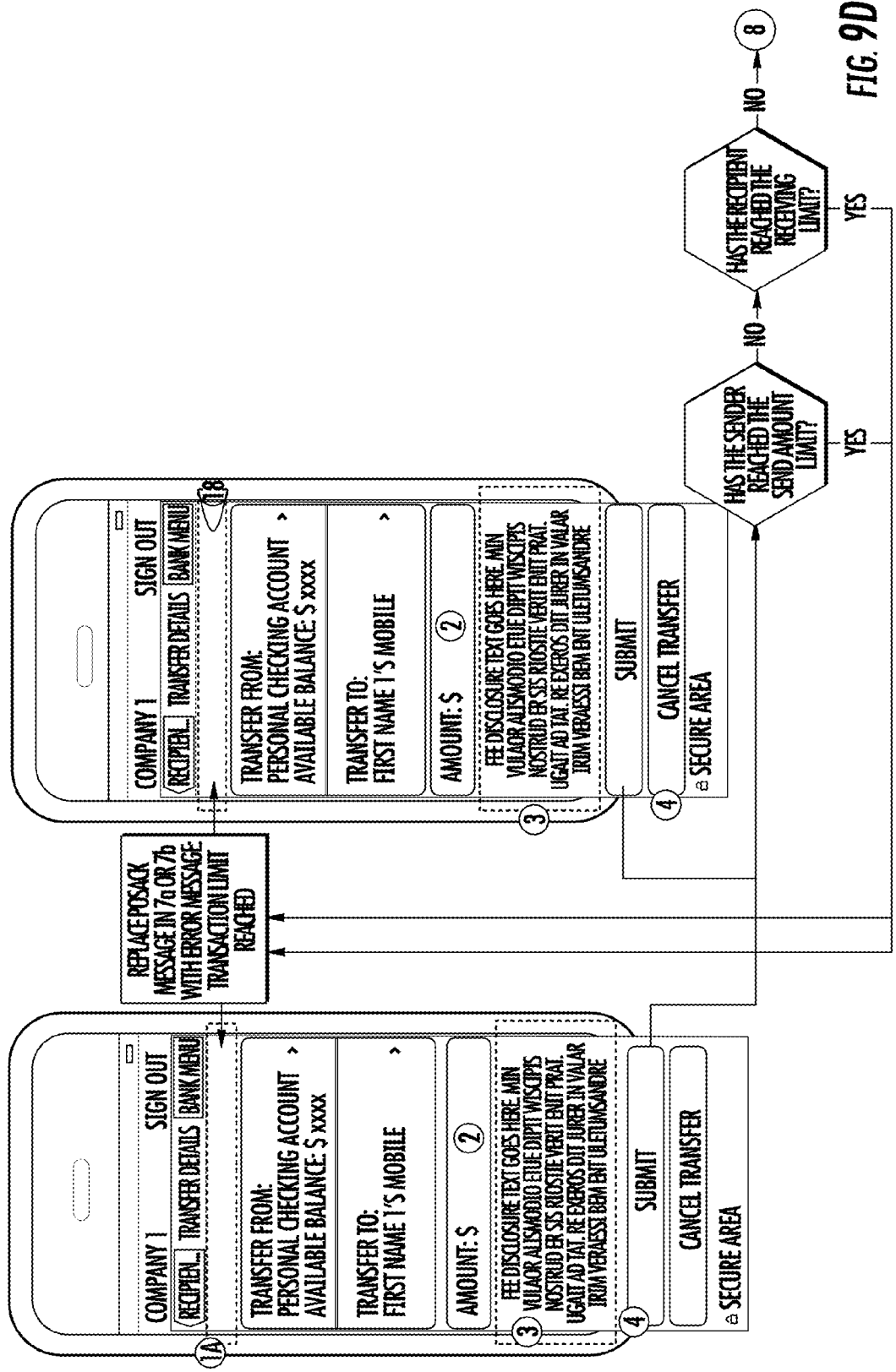

The process then moves to block 860 of FIG. 8C where the mobile P2P payment system client application 694 presents a transfer GUI showing selected account and selected/new recipient, and prompting the first user to enter a transfer amount. This is shown in FIG. 9D where the screenshot shows that on a transfer details page, the mobile P2P payment system client application 694 displays the transfer-from account, the transfer-to account or recipient alias, and an input text box for entering the amount that the first user 310 wishes to transfer. As shown in FIG. 9D, the GUI also presents disclosure text regarding any possible assessments that will be incurred by the first user for making this transfer. The GUI also displays a submit button for submitting the transfer and a cancel button for canceling the transfer and returning to the menu page shown in FIG. 9A.

The process then moves to block 862 of FIG. 8C where the mobile banking system 600 determines if the selected recipient is associated with an alias or a financial institution account number.

If, in block 862 of FIG. 8C, the mobile banking system 600 determines that the selected recipient is associated with an alias, then the process moves to block 864 where the mobile banking system 600 adds the transfer assessment and shows this transfer assessment in a GUI. If, in block 862 of FIG. 8C, the mobile banking system 600 determines that the selected recipient is not associated with an alias, then the process moves to block 866 where the mobile banking system 600 does not show or add a transfer assessment. As stated above and as shown in FIG. 9D, the mobile P2P payment system client application 694 displays any possible transfer assessment disclosure (along with the transfer assessment in some embodiments) in a text box. In one embodiment, this assessment disclosure text box is placed under the text input field where the first user enters the amount to be transferred.

The process then moves to block 868 of FIG. 8C where the first user enters a transfer amount in the appropriate text input field as shown in FIG. 9D.

Figure 8D:
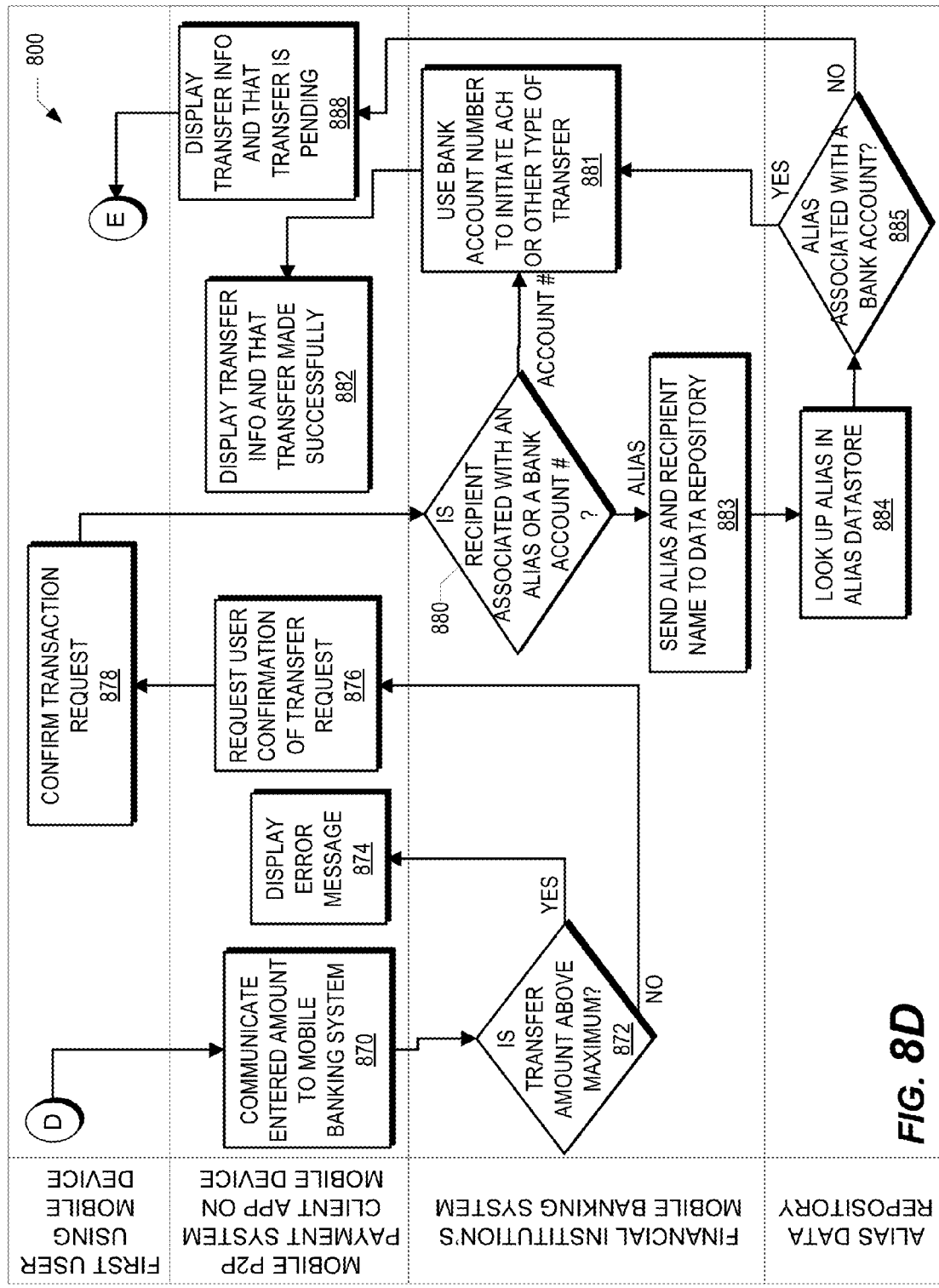

The process then moves to block 870 of FIG. 8D where the mobile P2P payment system client application 694 communicates the amount to be transferred to the mobile banking system 600.

The process then moves to block 872 of FIG. 8D where the mobile banking system 600 determines if the transfer amount is above a maximum limit placed on the transfer. In one embodiment, there is a pre-determined amount limit placed on the first user (sender). In another embodiment, there is a pre-determined amount limit placed on the recipient. In still another embodiment, both these pre-determined amount limits place a ceiling on the amount that can be transferred via a mobile P2P transfer. There may be several factors that affect this limit including, but not limited to, the first user's identity, the recipient's identity, the length and nature of the first user's relationship with the financial institution, the length and nature of the recipient's relationship with the financial institution, the amount of funds that the first user has deposited at the financial institution, the first user's status with the financial institution, and the like. In one embodiment, the maximum amount that can be transferred using the mobile P2P transfer method is dynamically determined, at the time of the transfer request, by a supporting application that works in conjunction with or is embedded within the mobile P2P payment system client application 694.

If in block 872 of FIG. 8D the transfer amount is above the maximum allowable limit, then the mobile P2P payment system client application 694 displays an error message to the first user.

Figure 9E:
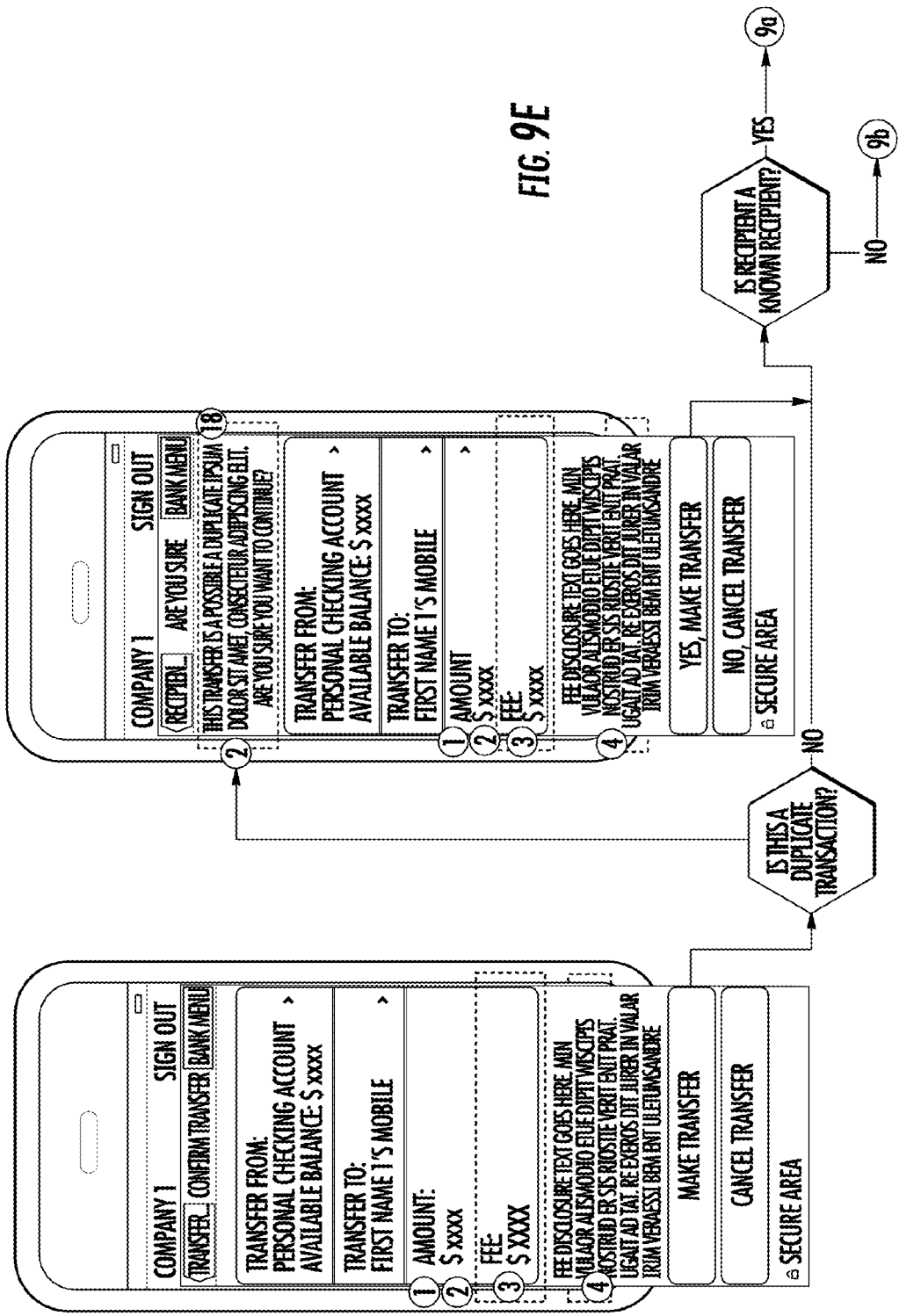

If in block 872 of FIG. 8D the transfer amount is below or equal to the maximum allowable limit, the mobile P2P payment system client application 694 requests user confirmation of the transfer request. A GUI that captures a screenshot of this pre-confirmation page is displayed in FIG. 9E(8). Here, the mobile P2P payment system client application 694 displays the transfer-from account, the transfer-to account or recipient alias, the amount to be transferred, and the assessment to be incurred by the first user for making this transfer. The GUI also displays assessment disclosure text on the page. In some embodiments, there is no assessment incurred by the first user for making the transfer. As shown in FIG. 9E(8), the GUI also displays two buttons or hyperlinks, one for making the transfer and one for canceling the transfer and returning to the bank menu page shown in FIG. 9A.

The process then moves to block 878 of FIG. 8D where the first user confirms the transaction request by activating the button or hyperlink for making the transfer. If the mobile banking system 600 recognizes that this transaction is a duplicate of another transaction executed within a pre-determined amount of time in the past, then, as shown in FIG. 9E(8a), the mobile P2P payment system client application 694 displays another pre-confirmation page informing the first user that the transfer is a possible duplicate of a recently executed transaction. As shown in FIG. 9E(8a), the GUI also displays two buttons or hyperlinks, one for making the transfer and one for canceling the transfer and returning to the bank menu page shown in FIG. 9A.

Figure 9F:
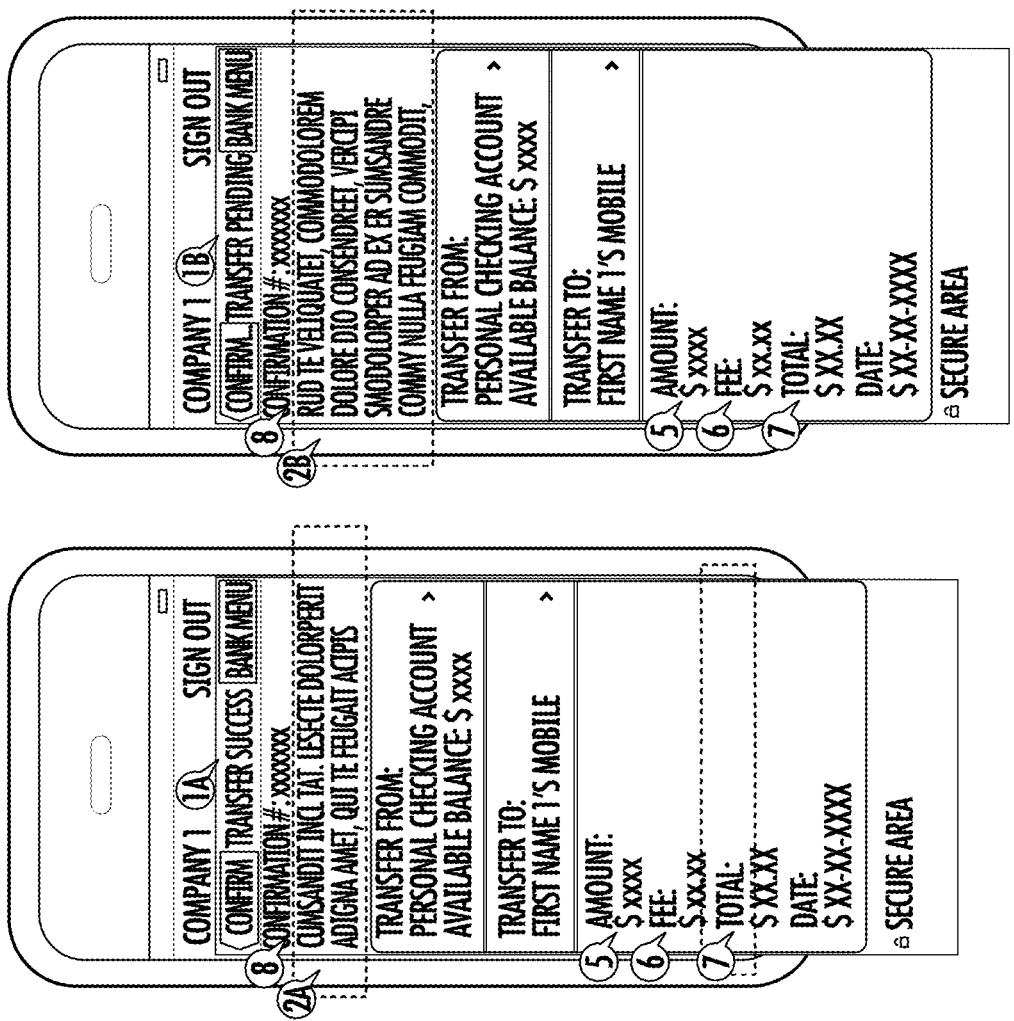
Figure 9G:
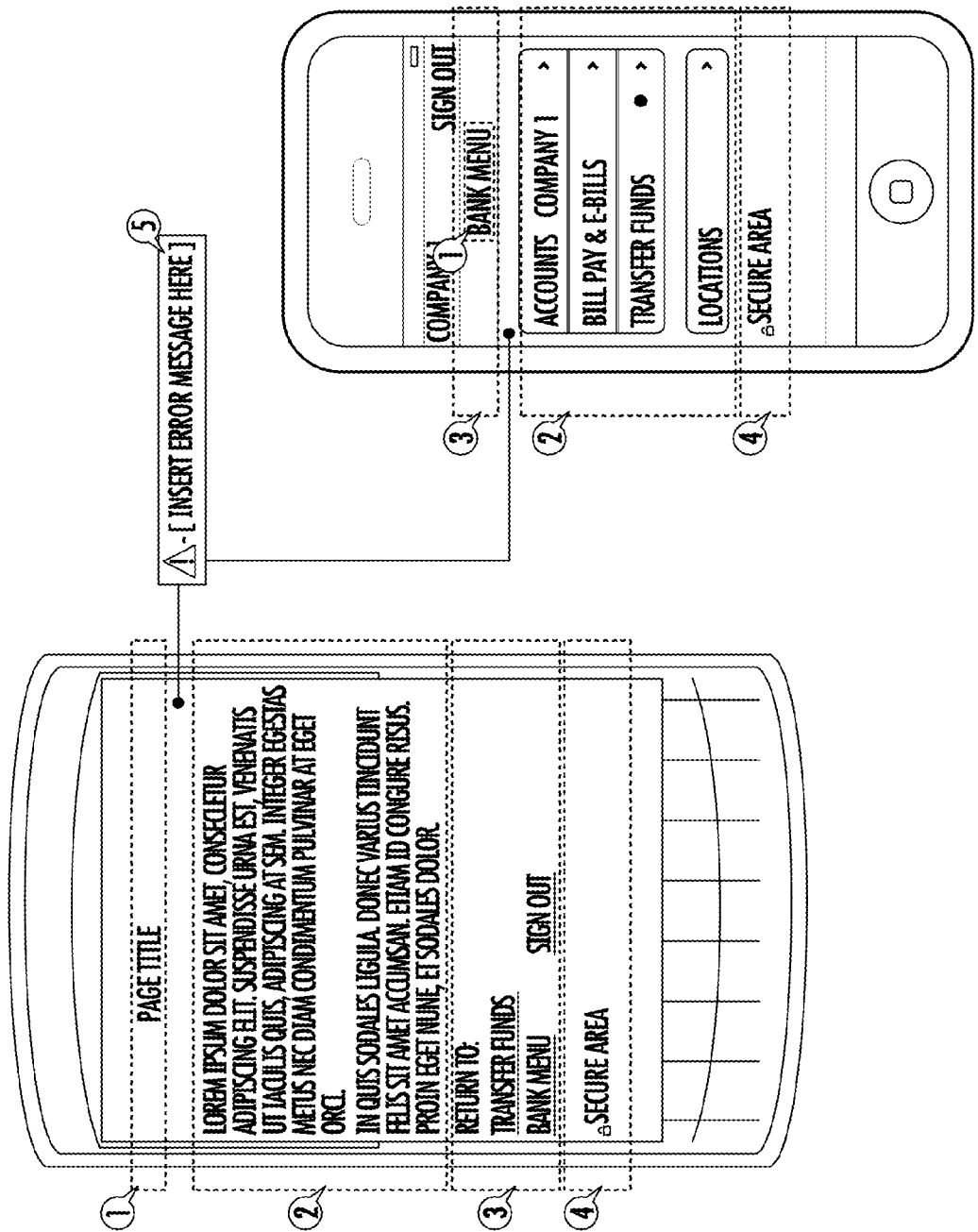

The process then moves to block 880 of FIG. 8D where the mobile banking system 600 determines whether the recipient is associated with an alias or a financial institution account number. If the recipient is associated with a financial institution account number, the process moves to block 881 where the mobile banking system 600 uses the financial institution account number to initiate an Automated Clearing House (ACH) transfer or other type of transfer. Subsequently, the process moves to block 882 of FIG. 8D where the mobile P2P payment system client application 600 provides notification to the first user that a transfer or a notice of transfer request to the recipient (second user) has been initiated and displays the information regarding the transfer to the first user. An instance of this notification is shown in FIG. 9G. FIG. 9G shows a confirmation page that displays the transfer-from account, the transfer-to account or recipient alias, the amount transferred, the assessment incurred by the first user for making this transfer, the total cost of the transfer, and the date on which the transfer was executed. The confirmation page also displays a confirmation number associated with the transfer.

If, in block 880, the recipient is associated with an alias then, the process moves to block 883 where the mobile banking system 600 sends the alias and the recipient's name to an alias data repository 700.

The process then moves to block 884 where the alias data repository 700 looks up the alias in an alias datastore. Then the process moves to block 885, where the alias data repository 700 determines whether the alias is associated with a financial institution account. If the alias is associated with a financial institution account, then, if the alias data repository 700 determines that the provided name matches the name in the datastore, then the process moves to block 881 of FIG. 8D where the mobile banking system 600 uses the financial institution account number to initiate the ACH transfer or other type of transfer. Subsequently, the process moves to block 882 of FIG. 8D where the mobile P2P payment system client application 694 provides notification to the first user that a transfer or a notice of transfer request to the recipient (second user) has been initiated and displays the information regarding the transfer to the first user. An instance of this notification is shown in FIG. 9F. FIG. 9F shows a confirmation page that displays the transfer-from account, the transfer-to account or recipient alias, the amount transferred, the assessment incurred by the first user for making this transfer, the total cost of the transfer, and the date on which the transfer was executed. The confirmation page also displays a confirmation number associated with the transfer. The confirmation page also displays whether the transfer has been successful FIG. 9F(9a) or whether it is still pending FIG. 9F(9b).

If in block 885 of FIG. 8D, the alias data repository 700 determines that the alias is not associated with a financial institution account, then the process moves to block 888 where the mobile P2P payment system client application 694 displays information about the transfer to the first user and indicates that the transfer is pending.

Figure 8E:
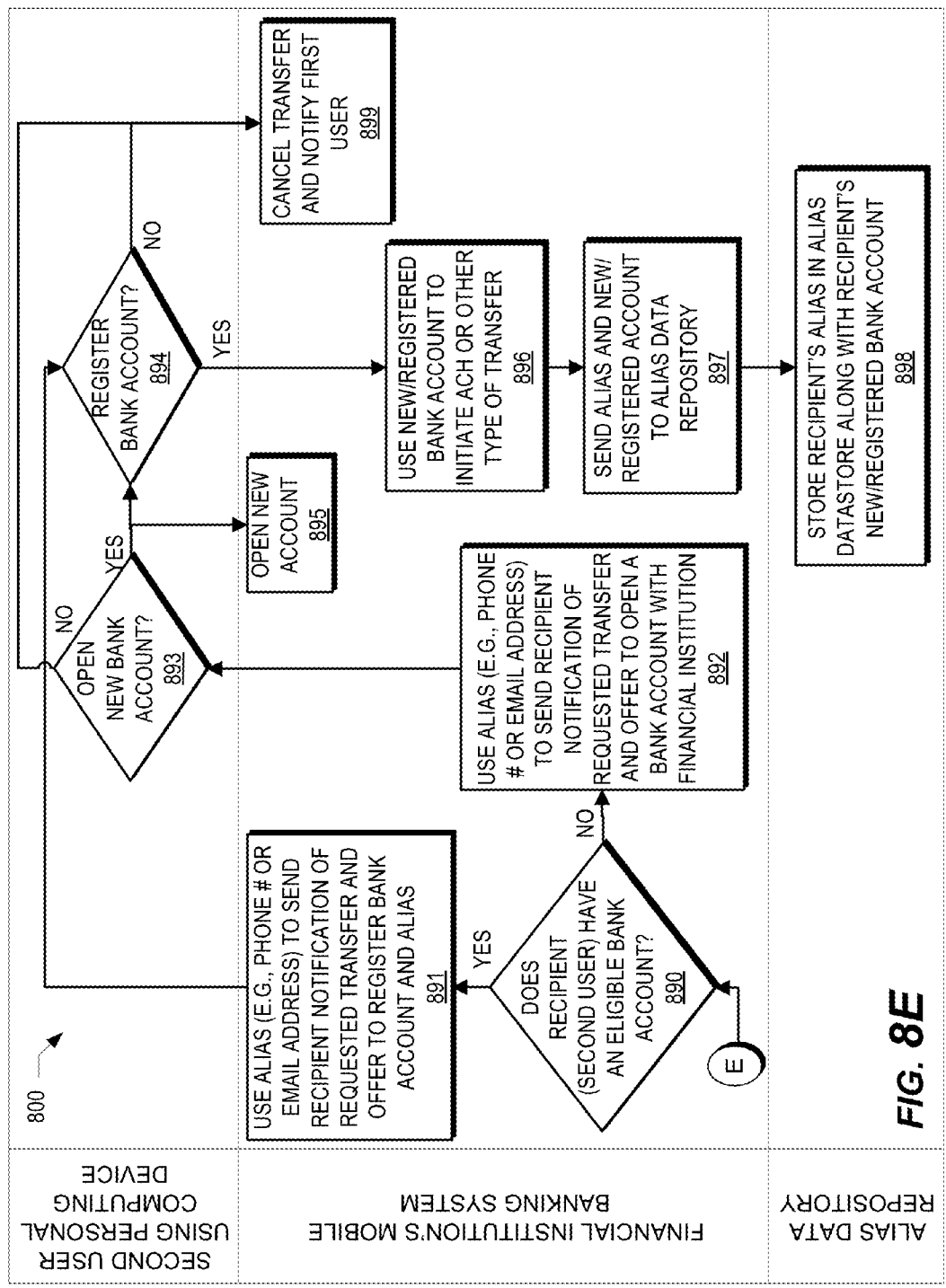

The process then moves to block 890 of FIG. 8E where the mobile banking system determines whether if the recipient (second user) has an eligible financial institution account. If the recipient (second user) does not have an eligible financial institution account, then in block 892, the mobile banking system 600 uses an alias to send the recipient notification of requested transfer from the first user and an offer to open a financial institution account with the financial institution that manages the mobile banking system 600. In one embodiment, the alias is a phone number or an email address.

The process then moves on from block 892 to block 893 of FIG. 8E, where if the second user decides to not open a financial institution account at the financial institution that manages the mobile banking system 600, then the mobile banking system 600 cancels the transfer and notifies the first user in block 899.

If in block 893 of FIG. 8D, the second user (recipient) decides to open a new financial institution account, the mobile banking system 600, in block 895, opens a new account for the second user. Subsequently, the second user (recipient) must determine in block 894 whether the second user registers the new financial institution account for the mobile P2P service.

As shown in FIG. 8E, if the second user in block 894 does not register the new financial institution account opened in block 895, then the mobile banking system 600 cancels the transfer and notifies the first user in block 899.

As shown in FIG. 8E, if the second user registers the new financial institution account in block 894 for mobile P2P transfers, then the mobile banking system 600, in block 896, uses the new registered financial institution account to initiate an ACH transfer or other type of transfer. The process then moves to block 897 where the mobile banking system 600 sends the alias and the new registered account information to the alias data repository 700. The process then moves to block 898 of FIG. 8E where the alias data repository 700 stores recipient's alias in alias datastore along with recipient's (second user's) new registered financial institution account.

If the recipient (second user) has an eligible financial institution account as determined by the mobile banking system 600 in block 890, then the process moves to block 891 in FIG. 8E where the mobile banking system 600 uses an alias (e.g., phone number or email address) to send recipient (second user) notification of requested transfer, and offers to register the recipient's financial institution account and alias. As shown in FIG. 8E, then the process moves to block 894 where if the second user (recipient) decides not to register the second user's financial institution account for mobile P2P transfers, then the mobile banking system 600 cancels the transfer and notifies the first user.

As shown in FIG. 8E, if the second user (recipient) registers the eligible financial institution account in block 894, then the mobile banking system 600 uses the eligible registered financial institution account to initiate an ACH transfer or other type of transfer in block 896. The process then proceeds to block 897 where the mobile banking system 600 sends alias and the eligible registered account information to the alias data repository 700. The process then moves to block 898 of FIG. 8E where the alias data repository 700 stores recipient's alias in alias datastore along with recipient's eligible registered financial institution account.

Mobile Banking Alias Registration and P2P Payment Receive Process and Interface

FIGS. 10A-10C provide flow charts illustrating a process 1000 for receiving P2P payments, in accordance with an embodiment of the invention. FIGS. 10A-10C illustrate the flow chart in terms of "swim lanes" associated with entities which may perform the operations in each respective swim lane. The entities illustrated in the exemplary Figures are a financial institution's mobile banking system 600 and a first user (recipient) using a first personal computing or mobile device. However, it should be noted that other entities could also be involved and some embodiments of the invention may not be limited to the two entities illustrated in FIGS. 10A-10C. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

The process 1000 in FIG. 10A starts with block 1005 where a mobile banking system 600 sends a first user (recipient) notice of a requested transfer from a second user, the notice including a link to the mobile banking system 600 and a confirmation number.

The process then proceeds to block 1010 where a first user (recipient) activates the link provided with the notice.

The mobile banking system 600 alerts the first user (recipient) that to accept the transfer, the first user will need an eligible checking or saving account at a participating financial institution. For customers who hold accounts at the financial institution that manages the mobile banking system 600, the mobile banking system 600 presents a widget with a textbox that allows the first user to enter login or other authenticating information. The mobile banking system 600 also provides a link for the first user to enroll with the financial institution's mobile banking system. For customers of other participating financial institutions, the mobile banking system 600 provides a sign-in button, which might either display a sign-in widget on the instant page or might provide for a link to another page where the first user can enter login information for the participating financial institution. The mobile banking system 600 also notifies the first user that if the first user does not have an account with one of the participating banks, that first user can open an account at the financial institution that maintains the mobile banking system 600. The mobile banking system 600 notifies the first user that he or she may review the terms of opening a new account at this financial institution, including any assessments that may be incurred by the first user in opening this new account. The mobile banking system 600 also notifies the first user that if the first user does not want to open a new financial institution account, the first user may notify the sender to arrange an alternate transfer method. The mobile banking system 600 also notifies the first user that the transaction will be canceled if it is not accepted within a pre-determined period of time.

The process then proceeds to block 1020 of FIG. 10A where the first user (recipient) determines whether the first user has an account with the financial institution that manages the mobile banking system 600. If the first user has a financial institution account with the financial institution that manages the mobile banking system 600, then the process moves to block 1050 where the first user enters authentication information into the appropriate textbox.

As shown in FIG. 10A, if the first user does not have a financial institution account with the financial institution that manages the mobile banking system 600 then the process proceeds to block 1022 where the first user determines whether the first user has an account with participating financial banks or financial institutions. If the first user has a financial institution account with a participating financial institution, the process proceeds to block 1040 where the first user can select the participating financial institution sign-in link. The process then moves to block 1045 where the mobile banking system 600 forwards the first user to a participating financial institution's website or alternatively, the mobile banking system 600 opens a widget or an applet on the same window or new pop-up window.

As shown in FIG. 10A, if, in block 1020, the first user does not have an account the financial institution that manages the mobile banking system 600 and if, in block 1024, the first user (recipient) does not open a new account with the financial institution that manages the mobile banking system 600, then, as shown in block 1035, after a defined period of time without recipient (first user) acceptance, the mobile banking system 600 cancels the transfer and notifies the second user (sender).

As shown in FIG. 10A if, in block 1024, the first user opens a new account with the financial institution that manages the mobile banking system 600, then the first user, in block 1025, selects the link directing the first user to open a new account with the financial institution that manages the mobile banking system 600.

As shown in FIG. 10A, the link in block 1025 directs the mobile banking system 600 to display a new account application GUI to the first user (see block 1030), which new account application quickly approves and opens a new account for the first user after receiving any pertinent information that may be required to open and be approved for a new account at the financial institution that manages the mobile banking system 600. The process then proceeds to block 1050 in FIG. 10A where the first user enters authentication information into a textbox.

The process then moves to block 1060 in FIG. 10B where the mobile banking system 600 prompts the first user to enter a confirmation number received with the transfer notice and agree to the terms governing the transfer. The mobile banking system 600 indicates to the first user that this is the start of the procedure to accept a transfer to money to the first user's email address or mobile number. The mobile banking system 600 prompts the first user to enter the received confirmation number in a textbox. The webpage also has two buttons—a first button configured to allow the first user to indicate a desire not to proceed with accepting the transfer and a second button configured to allow the first user to indicate a desire to proceed with the transfer. The second button can move from a dormant state to an activatable state by checking the checkbox to confirm that the first user has a) has read and agrees to the terms of the service agreement, including the terms of the Email/Mobile Network Transfer section; b) consents to receive email and automated text messages about Email/Mobile Transfers; c) will only register mobile numbers where the first user is the account holder; or if the first user is not the account holder, he or she has the account holder's permission to register that mobile number; and d) will obtain the consent of the person to whom he or she wants to send a Mobile Transfer text message to receive the automated text message. In one embodiment, the first user has to always go through the procedure of accepting the transfer. In other embodiments, the first user does not have to go through the procedure accepting the transfer for any transfer after the first transfer.

Subsequently, in block 1065, the first user enters a confirmation number in the appropriate textbox and agrees to the terms that govern the transaction by activating the appropriate checkbox. The first user then activates on the second button to continue the process of accepting the transfer.

The process then moves to block 1068 of FIG. 10B where the mobile banking system 600 uses the confirmation number entered in block 1065 to identify or confirm the transfer request.

Then the process proceeds to block 1070 of FIG. 10B where the mobile banking system 600 prompts the user to register the alias to which the transfer notice was sent. The mobile banking system 600 indicates to the first user that if the first user has received a notice that money was sent to the first user, then the first user will need to set up to accept transfers the same email address or mobile number that received the transfer notice. The page shows a first textbox where the user can enter the alias that received the transfer notice, and a second textbox where the user can confirm the alias entered in the first textbox by re-entering the alias in the second textbox. The mobile banking system 600 also prompts the user to select the appropriate account to link to the alias that will receive the funds by selecting the appropriate account from a drop down list. The mobile banking system 600 also prompts the user to check a checkbox, whereby the first user by checking the checkbox agrees that by registering the alias, he or she is the alias account holder, or has the alias account holder's permission to register it, and consents to receive email and text messages about alias transfers at this email address or phone number. In some embodiments, the mobile banking system 600 presents an authentication widget that will be described in further detail below. The page also has two buttons—a first button configured to allow the first user to indicate a desire not to proceed with receiving the transfer and a second button configured to allow the first user to indicate a desire to proceed with receiving the transfer. This second button moves from a dormant state to an activatable state after the first user enters all the required information on the page and has been further authenticated, as in some embodiments. In one embodiment, the mobile banking system 600 also saves the information entered on this page, so that the first user does not have to re-register an alias every time the first user receives a P2P money transfer.

The process then proceeds to block 1075 where the first user enters the alias in the appropriate textbox, confirms the alias in the appropriate textbox, selects the account to receive the funds from the drop-down list, and checks the checkbox that indicates that the first user accepts the terms that govern the transfer. In some embodiments, the accounts listed in the drop-down list are identified only by selected few digits of the account numbers.

In some embodiments, the process then proceeds to block 1077 where the mobile banking system 600 requires additional authentication to register an alias. The mobile banking system 600 displays a widget which serves as an additional authenticating step before saving the information of the first user's associated alias. The mobile banking system 600 indicates to the first user that by activating in the widget on the button for a sending a code, the first user will receive a code on his or her mobile device. In another embodiment, the first user may receive a code through other means such as email, snail mail, and the like. In one embodiment, the widget is a online banking security widget and the user can send a code to the first user's mobile device.

The process then moves to block 1079 of FIG. 10B where the first user performs an additional authenticating step. The first user activates on the widget's button for sending a code to the first user's mobile device. The first user than receives on his or her mobile device the code that he or she must input into the widget. Once the first user inputs the correct code into the widget and presses a button in the widget to confirm that the code is correct, the button that corresponds to adding a new recipient is activated so that it can now be activated by the first user. The first user (recipient) activates this button so that the mobile banking system 600 can store the first user's alias. The first user can activate a designated button on the page which indicates that the first user wishes to proceed with receiving the transfer. The mobile banking system 600 indicates to the first user that by activating the button to continue with receiving the transfer, the first user will receive an enrollment code.

The process then moves to block 1080 of FIG. 10D where the mobile banking system 600 uses the registered alias to send an enrollment code to the device of the first user (recipient) associated with the alias.

The process then moves to block 1082 of FIG. 10D where the mobile banking system 600 prompts the first user to enter the enrollment code that the first user received on the device associated with the alias. The mobile banking system 600 indicates to the first user that the first user must verify the alias (e.g., mobile number) to complete enrollment in the mobile P2P transfer service. In one embodiment, the webpage indicates to the first user that the first user should expect a text message from the financial institution that manages the mobile banking system 600. The page also has activatable text if the first user would like to know more about the use of enrollment codes. The page indicates to the first user, the enrollment code must be entered into the appropriate textbook in order verify ownership of the mobile number or email address associated with the alias and complete enrollment with the P2P transfer service. The mobile banking system 600 also indicates to the first user that the enrollment number expires in a pre-determined number of minutes. After the enrollment number expires, the mobile banking system 600 will not be able use that enrollment code to verify ownership of the first user's mobile number associated with the transfer and will not be able to complete the enrollment of the first user (recipient). The webpage also has activatable text to get help if the first user has not received an enrollment code or if the enrollment code has expired. The page indicates to the first user that messaging and data rates may apply for receiving the enrollment code. The page also has two buttons—a first button configured to allow the first user to indicate a desire not to proceed with the transaction and a second button configured to allow the first user to indicate a desire to proceed with receiving the transfer. The second button only moves from a dormant state to an activatable state after the first user enters an enrollment code on the page. In an embodiment, the second button only becomes activatable after the first user enters a valid and unexpired enrollment code on the page.

The process then moves to block 1084 where the first user enters the enrollment code into the appropriate textbox.

The process then moves block 1086 where the mobile banking system 600 determines if the enrollment code entered by the first user matches the enrollment code sent by the mobile banking system 600 to the alias of the first user.

If the entered code in 1086 does not match the code sent to the alias, then the mobile banking system 600 displays a graceful error message to the first user that the transaction cannot move any further. In one embodiment, the mobile banking system 600 allows the first user to correct any errors in the alias provided by the first user or in the code received by the first user. In one embodiment, the mobile banking system 600 only grants a pre-determined number of unsuccessful attempts to verify the code before rejecting the transfer.

If the entered code in 1086 matches the code sent to the alias, the process moves to block 1088 where the mobile banking system 600 processes any pending transfers involving the newly registered alias. The mobile banking system 600 indicates to the user that the verification of the alias has been completed. The mobile banking system 600 thanks the user for setting up an alias to accept transfers. The mobile banking system 600 indicates to the first user that people or entities can now send money to the first user using the first user's alias. The mobile banking system 600 indicates to the first user that any transfer to the first user's newly registered alias will be deposited to the account number shown on the webpage. In one embodiment, the mobile banking system 600 only shows a selected few digits of the first user's financial institution account number. The page also indicates to the first user that the transfer request is now in process. The page shows details of the transfer, including, but not limited to the name of the sender, the amount, the date on which the sender sent the amount, the confirmation number, and the status of the transfer. The page also two buttons. The first button allows the first user to add another alias and the second button allows the first user make a transfer using the newly registered alias.

The process then moves to block 1090 where the mobile banking system 600 sends the alias to the alias data repository 700 along with associated account information to be stored in the alias datastore.

In one embodiment, the mobile banking system 600 presents four hyperlinks under the transfers hyperlink described earlier. These four hyperlinks are a hyperlink for a making a transfer, a hyperlink for reviewing transfers, a hyperlink for adding recipients, and a hyperlink for managing accounts. Using the appropriate hyperlink, the first user has the option of obtaining set up to accept transfer by activating an appropriate link. The mobile banking system 600 indicates to the first user (recipient) that the first user may activate the link if the first user received a transfer notice, i.e., the first user received an email, text message, or other form of electronic communication that someone has sent money to the first user. The mobile banking system 600 indicates to the first user that in order to complete the transfer and collect the funds, the first user must set up the first user's alias to accept transfers. The mobile banking system 600 also presents a activatable link so that the first user can be directed to a page to learn more about this P2P transfer via alias method. The mobile banking system 600 also presents a help box where the first user can understand more about what the first user can do using the mobile banking system 600, what the first user needs to know, and what else the first user can do using the mobile banking system 600. The mobile banking system 600 also presents a message to the first user that transferring money within the bank is fast and free. The mobile banking system 600 also indicates to the customer that the feature of making a P2P transfer using a recipient's alias is a new feature, and that transfers within the bank now include transfers made using a recipient's alias. Alternatively, a user who intends to receive money using an alias can get set up by activating the link associated with obtaining a set up to accept transfers. A user who accesses the mobile banking system 600 can register an alias by selecting an appropriate link. Therefore, in one embodiment, the user does not have to wait to receive a payment using the mobile P2P transfer service before setting up an alias to receive transfers. In one embodiment, the user can register an alias using a mobile device, while in another embodiment, the user can register an alias using a personal computing device.

In one embodiment of the invention, both the sender and the recipient need to have financial institution accounts registered for mobile P2P transfer via alias. In another embodiment of the invention, the sender needs to have a financial institution account registered for mobile P2P transfer via alias, but the recipient does not need to have a financial institution account registered for mobile P2P transfer via alias. In another embodiment of the invention, the recipient needs to have a financial institution account registered for mobile P2P transfer via alias, but the sender does not need to have a financial institution account registered for mobile P2P transfer via alias.

Text Message P2P Payment Send Process and Interface

FIG. 11 provides a flow chart illustrating a process 1100 for sending P2P payments via text message, in accordance with an embodiment of the invention. FIG. 11 illustrates the flow chart in terms of "swim lanes" associated with entities which may perform the operations in each respective swim lane. The entities illustrated in the exemplary Figure are a financial institution's mobile banking system 600, a first user (sender) 310 using a first personal computing or mobile device 400, and an alias data repository 700. However, it should be noted that other entities could also be involved and some embodiments of the invention may not be limited to the three entities illustrated in FIG. 11. Additionally, it should be understood that, in other embodiments of the invention, the entities need not be required to perform the actions illustrated in each respective swim lane. For example, some of the process steps described herein may be performed by the first entity (or other entities) even though the element may be illustrated as in the swim lane of the second entity. Similarly, in some embodiments, some of the process steps may be performed by the second entity (or other entities) even though the element may be illustrated as in the swim lane of the first entity.

All features that are described above as being part of the mobile P2P payment process and interface are also part of the text message P2P payment process and service. In one embodiment of the invention, the text message P2P payment send process and interface is a feature provided in the mobile P2P payment send process and interface. In another embodiment of the invention, the text message P2P payment send process and interface is distinct from the mobile P2P payment send process and interface. This text message P2P transfer feature is particularly useful for users who carry mobile devices that do not have computing resources and cannot access the Internet, i.e., mobile devices that only have messaging features and can only access a phone network.

Figure 12A:
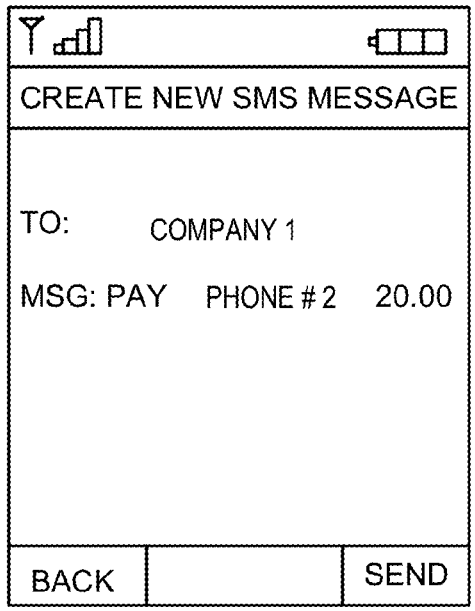

Referring to FIG. 11, the process starts in block 1110 of FIG. 11 where the first user 310 (sender) sends a text message to a phone number associated with a mobile banking system 600 in a format that is recognized by the mobile banking system 600. In one embodiment, the format includes the word "Pay" followed by the recipient's alias followed by the amount that the first user intends to transfer. An illustration of the text message that the first user sends in block 1110 of FIG. 11 is displayed in FIG. 12A. FIG. 12A shows that the text message is directed to "Bank X" and the message is to pay the sum of $20 to the recipient associated with the alias phone number.

The process then moves to block 1120 in FIG. 11 where the mobile banking system 600 receives the text message from the first user and sends the number from which the message originated to the alias data repository 700 along with the alias of intended recipient.

The process then moves to block 1130 in FIG. 11 where the alias data repository 700 looks up the number of the first user (sender) in the alias datastore.

The process then moves to block 1140 in FIG. 11 where the alias data repository 700 determines if the number of the first user is a number associated with a financial institution account. If the alias data repository 700 determines that the number of the first user is not a number associated with a financial institution account, the mobile banking system 600 replies to the first user with a graceful error message that the transaction cannot be completed (see block 1105). In one embodiment, the error message is sent via text message, however, in other embodiments, the error message can be sent by any form of communication such as email, placing a phone call to the first user, snail mail and the like.

If, in block 1140, the alias data repository 700 determines that the number of the first user is a number associated with a financial institution account, then the process moves to block 1150 in FIG. 11 where the alias data repository 700 looks up the recipient alias in the alias data store.

The process then moves to block 1160 in FIG. 11 where the alias data repository 700 determines if the recipient's alias is associated with a financial institution account. If the alias data repository 700 determines that the recipient alias is not associated with a financial institution account, the mobile banking system 600 replies to the first user with a graceful error message that the transaction cannot be completed (see block 1105). In one embodiment, the error message is sent via text message, however, in other embodiments, it can be sent by any form of communication such as email, placing a phone call to the first user, snail mail and the like.

If, in block 1160, the alias data repository 700 determines that the recipient alias is associated with a financial institution account, then the process moves to block 1170. At block 1170, the mobile banking system 600 determines whether the transfer amount is above the maximum that may be transferred in this transaction. If the mobile banking system 600 determines that the transfer amount is above the maximum that may be transferred in this transaction, then the mobile banking system 600 replies to the first user with a graceful error message that the transaction cannot be completed (see block 1105). In one embodiment, the error message is sent via text message, however, in other embodiments, it can be sent by any form of communication such as email, placing a phone call to the first user, snail mail and the like.

Figure 12B:
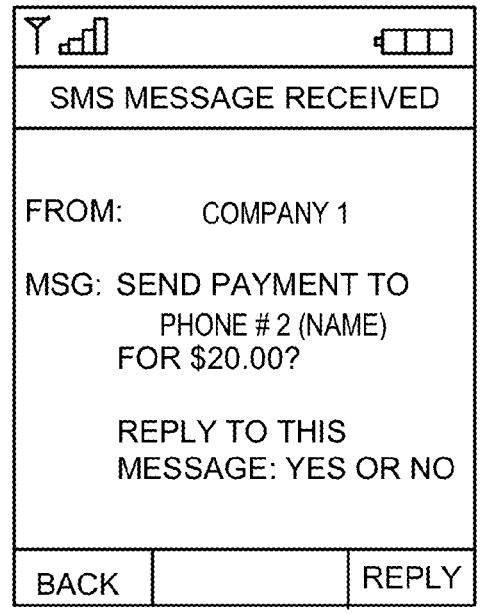

If, in block 1170, the mobile banking system 600 determines that the transfer amount is not above the maximum that may be transferred in this transaction, then the mobile banking system 600 sends a text message to the first user showing the requested transfer with the recipient name associated with the alias and requesting that the first user confirm the transfer request, wherein the format of the return confirmation text message is specified in the text message. In one embodiment, the recipient name associated with the alias is received from the alias data repository 700. In one embodiment, the text message in 1180 sent from the mobile banking system 600 specifies that the first user can confirm the transfer request with a "Yes" and can reject the transfer request with a "No." In other embodiments, the "Yes" and the "No" can be any letters, characters, or combinations thereof as defined by the mobile banking system 600. An illustration of the text message that the mobile banking system 600 sends to the first user in block 1180 of FIG. 11 is displayed in FIG. 12B. FIG. 12B shows that the text message is from "Bank X" and the message is whether the mobile banking system 600 should send a sum of money to a recipient who is identified by both an alias and a name. The text message also specifically informs the first user that the first user can confirm the payment with a "Yes" and can reject the payment with a "No."

Figure 12C:
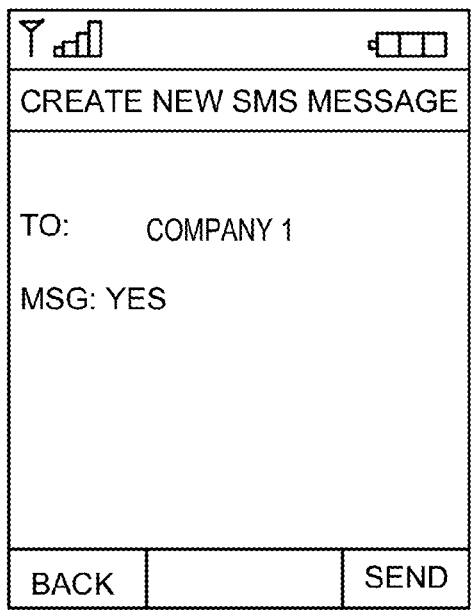

The process then moves to 1185 where the first user confirms the transaction request by replying to text message in 1180 with a "Yes." In other embodiments, the first user can confirm the transaction request in the format as specified in the text message sent in 1180 from the mobile banking system 600 to the first user. An illustration of the text message that the first user sends in block 1185 of FIG. 11 is displayed in FIG. 12C. FIG. 12C shows that the text message is directed to "Bank X" and the message is "Yes." This indicates that the first user is willing to go ahead with the payment.

The process then moves to block 1190 where the mobile banking system 600 uses the first user's and the recipient's financial institution account numbers to initiate ACH or other type of transfer from the financial institution account associated with the first user's (sender's) phone number to the financial institution account associated with the recipient's alias.

Figure 12D:
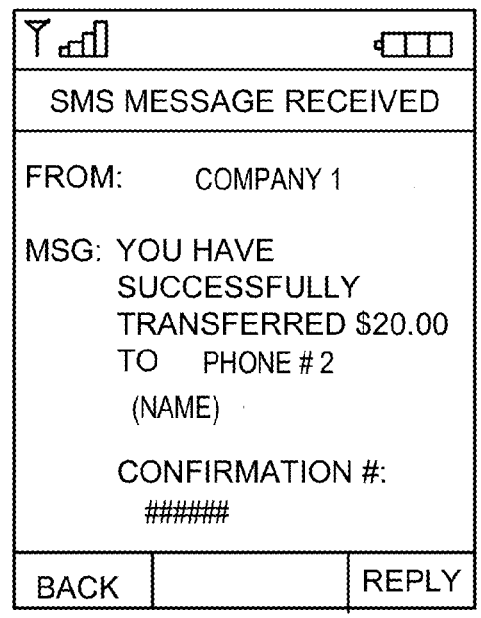

The process then moves to block 1195 where the mobile banking system 600 sends a text message to the first user with information regarding the transfer and with a message that the transfer initiated successfully. An illustration of the text message that the mobile banking system 600 sends to the first user in block 1195 of FIG. 11 is displayed in FIG. 12D. FIG. 12D shows that the text message is from "Bank X" and the message is that the first user has successfully transferred a sum of money to a recipient who is identified by name and alias. The text message also provides the first user with a confirmation number for the transfer.

Mobile Banking P2P Payment Management Process and Interface

As shown in FIG. 9G according to one embodiment of the invention, the mobile P2P payment system client application 694 displays a bank menu page on which the first user can navigate to an accounts function, a bill-paying function, a transfer funds function, or a location function. In one embodiment, each of these navigable options is a hyperlink, whereas in another embodiment, each of these navigable options is a button. The mobile P2P payment system client application 694 indicates to the first user that the first user is in a secure area of the mobile banking system 600. The bank menu page also has a text area where error messages are displayed. The mobile P2P payment system client application 694 always allows users to sign out from their accounts by providing an appropriate button or hyperlink.

Merchant Payment Request (Bill Pay) Environment

The mobile or online banking P2P payment system and environment may not only enable transferring funds from one user to an alias associated with another user, but may also enable sending payment requests from an entity (e.g., a payment requestor such as a merchant) to an alias associated with a user (e.g., a customer who received goods and/or services from the merchant in the past or who will receive goods and/or services from the merchant in the future), and allowing or enabling the user to satisfy the payment request. In embodiments of the invention described herein, a financial institution's banking system acts as intermediary system between the payment requestor and the user. In other embodiments of the invention, a financial institution's banking system may be replaced with any other intermediary system. The online or mobile banking P2P payment system allows the payment requestor to send payment requests to users of the online or mobile banking P2P payment system. As used herein, a merchant is an example of a payment requestor.

Currently, merchants (or other payment requestors) send payment requests (e.g., bills) to customers via either email or mail. When a customer receives a payment request via mail, that customer may send a check via mail to the merchant in order to satisfy the payment request. Alternatively, when a customer receives a payment request via either email or mail, the customer may log onto the merchant's website (assuming that the customer has already registered for an account on the merchant's website) and submit an electronic payment by submitting payment card information, bank account information, and the like.

The mobile or online banking P2P payment system allows merchants to push payment requests to users. In embodiments of the invention, in order to satisfy the payment request, the user may not need to provide the user's bank account number (or payment card number such as credit card number) to the merchant. Moreover, in embodiments of the invention, in order to satisfy the payment request, the user may not need to provide to the financial institution associated with the user's bank account, the user's account number associated with the merchant. Therefore, the user may need to provide only an alias (e.g., mobile telephone number email address, social network account, and the like) to the financial institution in order to allow payment requests from a merchant to be routed to the user and for the user to respond to and satisfy those payment requests.

As used herein, an account (or a bank account) may be the relationship that an individual or a first entity such as a business organization, hereinafter referred to as the "user" or "client" or "account holder," has with a second entity, which may be a financial institution. For instance, this account may be a deposit account, such as a transactional account (e.g., a bank account), a savings account, an investment account, a money market account, a time deposit, a demand deposit, or a pre-paid account. This account could also be a credit account such that the account holder has a repayment or delivery obligation towards a second entity under previously agreed upon terms and conditions.

The system allows the merchant to easily and conveniently deliver payment requests (e.g., bills) to customers (e.g., users). In embodiments where the merchant pushes payment requests to the user's mobile device (e.g., via a text message, mobile application alert, and the like), the user is immediately notified of the payment request. When a user makes an electronic payment, the merchant also gains quicker access to the paid funds compared to when a user mails in a payment. The system also allows users to conveniently satisfy payment requests without providing their bank account or payment card information to the merchant. Therefore, the user may assessment secure by not sharing their bank account or payment card information with third parties. Furthermore, the system may also allow users to conveniently satisfy payment requests from merchants without providing to the financial institution, the user's account number on the merchant's website (e.g., the user's account number associated with a utility company).

FIG. 13 provides another block diagram illustrating a mobile or online banking P2P payment system and environment 1300, in accordance with an embodiment of the invention. FIG. 13 is similar to FIG. 3 (described above) but also includes a merchant 1301. As used herein, a merchant 1301 is an entity (or a person) who requests a payment from a first user 310 or second user 320. The environment enables the first user 310 or the second user 320 to satisfy the payment request via the P2P payment environment 1300. The first user 310 or the second user 320 may be a person, but may also be a business (e.g., a merchant) or any other entity capable of sending or receiving funds.

The environment 1300 also includes a mobile device 400 and a personal computing device 500 for the first user 310 and second user 320, respectively. The personal computing device 500 may be any device that employs a processor and memory and can perform computing functions, such as a personal computer or a mobile device. As used herein, a "mobile device" 400 is any mobile communication device, such as a cellular telecommunications device (i.e., a cell phone or mobile phone), personal digital assistant (PDA), a mobile Internet accessing device, or other mobile device.

The mobile device 400 and the personal computing device 500 are configured to communicate over a network 350 with a financial institution's banking system 600 and, in some cases, one or more other financial institution banking systems 370. The first user's mobile device 400, the second user's personal computing device 500, the financial institution's banking system 600, an alias data repository 700, and any other participating financial institution's banking systems 370 are each described in greater detail above with reference to FIGS. 4-7. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352.

In general, a mobile device 400 is configured to connect with the network 300 to log the first user 310 into a banking system 600. The banking system 600 involves authentication of a first user in order to access the first user's account on the banking system 600. For example, the mobile banking system 600 is a system where a first user 310 logs into his/her account such that the first user 310 or other entity can access data that is associated with the first user 310. For example, in one embodiment of the invention, the banking system 600 is a mobile banking system maintained by a financial institution. In such an embodiment, the first user 310 can use the mobile device 400 to log into the mobile banking system to access the first user's mobile banking account. Logging into the banking system 600 generally requires that the first user 310 authenticate his/her identity using a user name, a passcode, a cookie, a biometric identifier, a private key, a token, and/or another authentication mechanism that is provided by the first user 310 to the banking system 600 via the mobile device 400.

The financial institution's banking system 600 is in network communication with other devices, such as other financial institutions' transaction/banking systems 370, an alias data repository 700, a mobile device 400 that is configured to communicate with the network 350 to log a first user 310 into the banking system 600, and a personal computing device 500 that is configured to communicate with the network 350 to log a second user 320 into the banking system 600. In one embodiment, the invention may provide an application download server such that software applications that support the banking system 600 can be downloaded to the mobile device 400.

The merchant's payment system 1405 (associated with the merchant 1301) is in network communication with other devices, such as other financial institutions' transaction/banking systems 370, an alias data repository 700, a mobile device 400 that is configured to communicate with the network 350 to log a first user 310 into the banking system 600, a personal computing device 500 that is configured to communicate with the network 350 to log a second user 320 into the banking system 600. The merchant's payment system 1405 may be configured to be controlled and managed by the merchant 1301, and not the financial institution.

In some embodiments of the invention, the application download server is configured to be controlled and managed by one or more third-party data providers (not shown in FIG. 13) over the network 350. In other embodiments, the application download server is configured to be controlled and managed over the network 350 by the same entity that maintains the banking system 600.

In some embodiments of the invention, the alias data repository 700 is configured to be controlled and managed by one or more third-party data providers (not shown) over the network 350. In other embodiments, the alias data repository 700 is configured to be controlled and managed over the network 350 by the same entity that maintains the financial institution's banking system 600. In other embodiments, the alias data repository 700 is configured to be controlled and managed over the network 350 by the financial institution implementing the mobile payment system of the present invention. In still other embodiments, the alias data repository 700 is a part of the banking system 600.

FIG. 14 provides a block diagram illustrating the merchant payment system 1405 of FIG. 13 in greater detail, in accordance with an embodiment of the invention. As illustrated in FIG. 14, in one embodiment of the invention, the payment system 1405 includes a processing device 1420 operatively coupled to a network communication interface 1410 and a memory device 1450.

It should be understood that the memory device 1450 may include one or more databases or other data structures/repositories. The memory device 1450 also includes computer-executable program code that instructs the processing device 1420 to operate the network communication interface 1410 to perform certain communication functions of the merchant's bill payment system 1405 described herein. For example, in one embodiment of the merchant's bill payment system 1405, the memory device 1450 includes, but is not limited to, a network server application 1470, a payment request push application 1460, and customer account information 1484, and other computer-executable instructions or other data. The computer-executable program code of the network server application 1470 and the payment request push application 1460 may instruct the processing device 1420 to perform certain logic, data-processing, and data-storing functions of the bill payment system 1405 described herein, as well as communication functions of the bill payment system 1405.

In some embodiments, the payment request push application 1460 enables the merchant to push payment requests associated with the first user 310 or the second user 320 to the financial institution's banking system 600, which in turn, pushes the payment request to the first user 310 or the second user 320. Alternatively, the payment request push application 1460 enables the merchant to push payment requests directly to the first user 310 or the second user 320 without first pushing the payment request to the financial institution's banking system 600. In some embodiments, the customer account information 1484 is limited to only alias information associated with the first user 310 or the second user 320 (e.g., mobile phone number, email address, a social network account, URL address, picture, logo, brand, trademark, graphical art, and the like). In other embodiments, the customer account information 1484 may include other information associated with the first user 310 or the second user 320 such as a first name, a last name, a mailing address, an account number associated with the merchant, financial payment information such as a bank account number, a payment card number, and the like.

As used herein, a "communication interface" generally includes a modem, server, transceiver, and/or other device for communicating with other devices on a network, and/or a user interface for communicating with one or more customers. Referring again to FIG. 14, the network communication interface 1410 is a communication interface having one or more communication devices configured to communicate with one or more other devices on the network 350, such as the mobile device 400, the personal computing device 500, the banking system 600, the other financial institution banking systems 370, and the alias data repository 700. The processing device 1420 is configured to use the network communication interface 1410 to transmit and/or receive data and/or commands to and/or from the other devices connected to the network 350.

FIG. 15 provides a flow chart illustrating a process 1500 for pushing payment requests to aliases associated with users, in accordance with embodiments of the invention. The entities illustrated in the exemplary Figure are a payment requestor (e.g., a merchant 1301), a financial institution banking system 600, and an entity from whom a payment is requested (e.g., a first user 310 using a mobile device 400, a second user 320 using a personal computing device 500, and the like). However, it should be noted that other entities could also be involved and some embodiments of the invention may not be limited to the entities illustrated in FIG. 15. Although a process step may be presented as being performed by one entity, in other embodiments, the process step may be performed by another entity.

At block 1504, the merchant's payment system 1405 may create a payment request associated with a user (e.g., first user of a mobile device or a second user of a personal computing device). In some embodiments, the merchant's payment system may generate the payment requests automatically. In other embodiments, personnel associated with the merchant may manually input payment requests via a computing device (connected to the merchant's payment system via a network) that are subsequently transmitted by the merchant's payment system. The payment request may be for a service provided or goods rendered to the first user or the second user by the merchant in the past. Alternatively or additionally, the payment may for a service to be provided or goods to be rendered to the user in the future. In some embodiments, the payment request may be a periodic payment request (e.g., a monthly payment request for all services provided or goods render to the user within the previous month). For instance, the merchant may be an electrical utility provider and the payment request may concern assessments incurred by the user during the previous month.

The payment request created by the merchant may include the user's name, the user's alias (e.g., user's mobile telephone number, the user's email address, the user's social network account, URL address, picture, logo, brand, trademark, graphical art, and the like), the amount to be paid, the deadline for payment, and the like. In some embodiments, a user may have previously authorized the merchant to push the payment request to the financial institution's banking system using the user's alias. In some embodiments, the user's authorization may be conveyed by the user to the merchant via the financial institution's banking system. In other embodiments, the user's authorization may be directly conveyed by the user to the merchant.

In some embodiments, the merchant may push the payment request (via the merchant's payment system 1405) to the financial institution's banking system. In some embodiments, in order to push, via the financial institution's banking system, payment requests to aliases associated with the user, the merchant may have to register an account or a profile with the financial institution. Subsequently, the financial institution may allow the merchant to access an application interface that allows the merchant to push, either automatically or with manual intervention, payment requests to aliases associated with the user.

In some embodiments, the financial institution's banking system sends the alias (and in some instances both the alias and the name of the user associated with the alias) to the alias data repository 700. Subsequently, the alias data repository (a processing system associated with the alias data repository) determines whether the received alias is associated with an account at the financial institution. If the alias data repository determines that the received alias is associated with an account at the financial institution (or at any other eligible financial institution), the alias data repository may subsequently determine whether the name included in the payment request matches the name associated with the alias in the data repository. If, as determined by the alias data repository, the name included in the payment request matches the name associated with the alias in the data repository, the alias data repository forwards a message to the financial institution's banking system that manages the bank account (or financial institution account) associated with the received alias that the alias received with the payment request is associated with a bank account at the financial institution and that the name received with the payment request matches the name associated with the alias in the alias data repository. In such embodiments, as presented by block 1508, the financial institution's banking system forwards the payment request to the alias.

In some embodiments, the alias data repository may determine that the name included in the payment request does not match the name associated with the alias in the alias data repository (even though the alias data repository may determine that the alias included in the payment request is associated with a bank account at the financial institution). If, as determined by the alias data repository, the name included in the payment request does not match the name associated with the alias in the data repository, the alias data repository forwards a message to the financial institution's banking system that manages the bank account associated with the received alias that the name received with the payment request does not match the name associated with the alias in the alias data repository. Subsequently, the financial institution's banking system forwards a message to the merchant's payment system that the payment request cannot be forwarded to the alias because the name included in the payment request does not match the name associated with the alias in the alias data repository.

If the alias data repository determines that the alias is associated with a banking account at another participating (or eligible) financial institution (and determines that the name included in the payment request matches the name associated with the alias in the alias data repository), the alias data repository may instruct the financial institution's banking system to push the payment request to the participating financial institution's banking system 370, and the participating financial institution's banking system may subsequently push the payment request to the user. In some embodiments, the alias data repository may not only receive the alias from the financial institution's banking system, but may also receive the payment request from the financial institution's banking system. Therefore, in such embodiments, while the alias data repository may receive details about the payment request from a first financial institution's banking system, the alias data repository may forward details of the payment request to a second financial institution's banking system if the alias data repository determines that the alias is associated with a banking account at the participating financial institution's banking system. As used herein, a participating financial institution is a financial institution that has access to the alias data repository.

If the alias data repository determines that the received alias is not associated with an account at the financial institution (or at any other eligible financial institution), the alias data repository forwards an appropriate message to the financial institution's banking system reporting that the received alias is not associated with an account at the financial institution. Subsequently, the financial institution's banking system may forward a message to the merchant's payment system indicating that the payment request cannot be forwarded to the user because the alias cannot be found in the alias data repository. The merchant may then forward the payment request directly to the user via email or mail, and the user may satisfy the payment request without involving the financial institution's banking system. Since the financial institution banking system determined a user who does not have a bank account at the financial institution that manages the financial institution banking system, the financial institution's banking system may forward an invitation to the user via the user's alias to open a bank account at the financial institution that manages the financial institution banking system.

In some embodiments, in response to receiving a payment request associated with an alias, the financial institution's banking system pulls information from the alias data repository based at least partially on the received alias in the payment request (rather than pushing the alias (and/or the payment request) to the alias data repository). The objective of pulling information from the alias data repository is to determine whether the alias is associated with a banking account at the financial institution and whether the name associated with the payment request matches the name associated with the alias in the alias data repository.

In embodiments where the banking system pushes the payment request to the user' mobile telephone number, the payment request may be in the form of a text message sent to the user's mobile device. The text message may include the name of the entity or merchant pushing the payment to the user, the amount of the payment, the date the payment is due, the possible methods of payment, and the like. The text message may include instructions on how to respond to the message. For instance, the text message may present a message such as "Reply 'Pay Now' to pay immediately." As further instance, the text message may present a message such as "Reply 'Remind me Later' to send a reminder to satisfy the payment request in the future." As a further instance, the text message may present a message such as "Reply 'Pay on xx/yy/zz to schedule payment on xx/yy/zz.'" If the user responds with the message 'Pay on xx/yy/zz,' the message directs the financial institution's banking system to satisfy the payment request using funds from a selected account on a selected date in the future. The selected account may be a default banking account (e.g., Checking Account) associated with satisfying payment requests. A user may select this default account when setting up, on the user's financial institution profile, payment requests to be routed to the user using the user's alias.

If the user responds with a 'Pay Now' message, a payment response may be sent from the user's mobile device to the financial institution's banking system. If the user responds with the message 'Pay Now,' the message directs the financial institution's banking system to satisfy the payment request using funds from the selected account (i.e., the default account described previously). In other embodiments, in response to receiving a 'Pay Now' response, the financial institution's banking system may respond with a further message. For instance, this message may state: "Reply 'Checking Account' to pay from Checking Account, Reply 'Savings Account' to pay from Savings Account, or Reply 'x % Checking y % Savings' to pay x % of the payment amount from Checking Account and y % of the payment amount from the Savings Account." The user may subsequently respond with an appropriate message.

In other embodiments where the financial institution's baking system pushes the payment request to the user's mobile telephone number, the payment request may in the form of an alert associated with a mobile application. Therefore, the mobile application alerts the user (with a beep, a vibration, and the like) that the mobile application has received a payment request. When the user accesses the mobile application, the mobile application interface may present a message that a payment request has been received. The message may include the name of the entity or merchant pushing the payment to the user, the amount of the payment, the date the payment is due, the possible methods of payment, and the like. For instance, one or more digital selections may be presented on the mobile application interface. The first selection may be an option to pay immediately. If the user selects this option, a payment response may be sent from the user's mobile device to the financial institution's banking system. In some embodiments, in response to selecting the first option, the financial institution's banking system satisfies the payment request using funds from a default bank account (established when the user set up on the user's financial institution profile, payment requests to be routed to the user using the user's alias). In other embodiments, in response to selecting the first option, the mobile application interface presents a list of accounts that have the requisite funds sufficient to satisfy the amount of the payment request. The user may subsequently choose one of the presented accounts from which the make the payment, and subsequently this information is also sent to the financial institution's banking system. Another selection may be an option to pay the requested amount in the future. This option may either be a 'remind me later' option or an option to pay the requested amount on a particular date in the future (e.g., directing the financial institution's banking system to satisfy the payment request using funds from a selected account on a selected date in the future).

In embodiments where the financial institution's banking system pushes the payment request to the user' email address, the payment request may be in the form of an email message. The email message may include the name of the entity or merchant pushing the payment to the user, the amount of the payment, the date the payment is due, the possible methods of payment, and the like. For instance, one or more digital selections may be presented in the email message. The first selection may be an option to pay immediately. If the user selects this option, a payment response may be sent from the user's personal computing device to the financial institution's banking system. In some embodiments, in response to selecting the first option, the financial institution's banking system satisfies the payment request using funds from a default bank account (established when the user set up, on the user's financial institution profile, payment requests to be routed to the user using the user's alias). In other embodiments, in response to selecting the first option, the email application interface may present a pop-up that displays a list of accounts that have the requisite funds sufficient to satisfy the amount of the payment request. The user may subsequently choose one of the presented accounts from which the make the payment, and subsequently this information is also sent to the financial institution's banking system. Another selection may be an option to pay the requested amount in the future. This option may either be a 'remind me later' option or an option to pay the request amount on a particular date in the future (e.g., directing the financial institution's banking system to satisfy the payment request using funds from a selected account on a selected date in the future).

In embodiments where the financial institution's banking system pushes the payment request to the user' social network account, the payment request may be in the form of an alert associated with the social network account. This alert may be presented to the user the next time when the user accesses the user's social network account. Alternatively or additionally, the alert may be forwarded to an email address or a mobile phone number (or other contact mechanism) associated with the user's social network account so that the user may be alerted prior to the time the user accesses (or logs into) the user's social network account. The social network alert may include a message that includes details about the payment request, e.g., name of the entity or merchant pushing the payment to the user, the amount of the payment, the date the payment is due, the possible methods of payment, and the like. One or more digital selections may also be presented in the social network alert. These digital selections may be similar to those described with respect to the embodiment where a payment request is pushed to an email address (described above).

In some embodiments, a user may establish multiple aliases with the user's bank account. In some embodiments where there are multiple aliases associated with a user's bank account (e.g., mobile telephone number, email address, social network account, and the like), the financial institution's banking system may push the payment request to each of the aliases. If the user takes an action with respect to the payment request (satisfies the payment request immediately, schedules satisfaction for the payment request for a future date, requests a reminder, and the like) via one of the aliases, the banking system may subsequently send a message or alert to each of the aliases, where the message includes information that the previously sent payment request has been addressed. This is important so that the user does not think that the payment requests sent to each of the different aliases are different payment requests and so that the user does not submit payment instructions from multiple aliases. In some embodiments, the financial institution's banking system may not send this message to the alias through which the payment request is satisfied (i.e., the banking system sends the message to the other aliases associated with the user's banking account).

Thereafter, the user (e.g., the first user using the mobile device or the second user using the personal computing device) receives the payment request. In some embodiments, the user may have previously registered an alias with the user's bank account at the financial institution. In such embodiments, the user may receive the payment request and view the details of the payment request. For instance, if the user receives the payment request via a text message, the user may view the name of the entity or merchant pushing the payment to the user, the amount of the payment, the date the payment is due, the possible methods of payment, and the like. The user may also view the same details associated with the payment request if the user receives the payment request via a mobile application alert, via email, via a social network account, and the like.

In embodiments where the user has a bank account with the financial institution but has not previously registered an alias with the financial institution, the user may receive an alert that a merchant or other entity wants to send a payment request to the user and invites the user to follow set-up instructions to set up an alias associated with the user's bank account that would allow the user to receive the payment request and submit instructions to satisfy the payment request. Therefore, if the user has not registered an alias with the financial institution, the alert may be received in the form of a text message, a mobile application alert, an email message, a message via the user's social network account, and the like. Once the user sets up an alias to associate with the user's banking account, the user may subsequently receive the payment request details and instructions on how to satisfy the payment request.

As described previously, in some embodiments, the user may receive payment requests to the user's alias if the user previously set up the user's account (i.e., user's banking account, user's profile associated with the financial institution, and the like) to receive payment requests (in addition to funds transfers) via the user's alias. In other embodiments, the user may receive payment requests to the user's alias if the user previously selected an option to receive payment requests from a particular merchant via the user's alias. In embodiments whether the user does not select an option to receive payment requests from a particular merchant via the user's alias, that merchant may not send, via the financial institution's banking system, payment requests to the user's alias.

In some embodiments, the user (e.g., the first user using the mobile device) may forward the payment request to a mobile phone number, an email address, a social network account associated with a second user. A user may want to forward a payment request if the user wants the second user to satisfy the payment request. The second user to whom the payment request is forwarded may satisfy the payment request if that second user has a bank account associated with a participating or eligible financial institution (i.e., a financial institution that has access to the alias data repository).

Thereafter at block 1512, the user who has an alias associated with the user's bank account and receives a payment request may submit payment instructions via the interface of the mobile device (or personal computing device). For instance, if the user receives the payment request via text message, the user can respond via text message directing the banking system to satisfy the payment request using funds from the user's default banking account (or from one of user's accounts specified by the user in the return text message). As a further instance, the user may select on an application interface an option (e.g., a digital button, icon, menu, and the like) to satisfy the payment request immediately.

In other instances, the user may select an option (or respond with an appropriate message) to satisfy the payment request at a scheduled time in the future. In still other instances, the user may select an option (or respond with an appropriate message) to neither satisfy the payment request now nor satisfy the payment request in the future, but rather an option to be reminded of the payment request after a predetermined period of time (e.g., two days). In embodiments where the user selects an option to satisfy the payment request immediately, the payment request may be satisfied using funds from an account associated with the alias if the account is the only account associated with the alias. In embodiments where the user has multiple accounts associated with the alias, selecting the option may prompt a pop-up message (or a return text message from the financial institution's banking system) that presents the user with one or more accounts that can be used to satisfy the payment request. In one instance, the user may select one of the presented accounts (or respond with an appropriate text message indicating the user's selection) to satisfy the payment request. When the user selects an account, the financial institution's banking system initiates a funds transfer from the selected account to an account associated with the merchant. In some embodiments, the user may select (or respond with an appropriate text message) more than one of the presented accounts to satisfy the payment request along with percentages of the payment request to be satisfied from each account (or absolute amounts to be debited from each account). Thereafter, at block 1516, the merchant may receive the payment satisfying the payment request from one or more accounts associated with the user.

FIGS. 16A-16F illustrate screenshots of interfaces of a mobile device that receives a payment request from a financial institution's banking system, and enables a user to respond to the payment request. The interfaces presented in FIGS. 16A-16F are merely exemplary, and the interfaces in other embodiments may include more information (or less information) than that presented in FIGS. 16A-16F.

Figures 16A, 16B, 16C, 16D, 16E, 16F:

FIG. 16A presents a text message received from the financial institution's banking system to the user's mobile device. The message indicates that the user received a bill from Merchant1 for $20.00. The message also indicates that the user can respond to this message by responding with the text 'Pay Now' or 'Pay Later.' In FIG. 16B, the user responds to the financial institution's banking system with the text 'Pay Now.' In FIG. 16C, the financial institution's banking system forwards a message to the user indicating to the user that the user has successfully paid $20.00 to Merchant1. The financial institution banking system's message also includes a confirmation number for the successful payment. In other embodiments, in response to receiving the 'Pay Now' message from the user's mobile device, the financial institution's banking system sends another message to the user's mobile device. This message asks the user whether the user wants to pay the $20.00 from Account1, Account2, or Account3. The message also indicates to the user that the user can respond to this message with the text 'Account1,' 'Account2,' or 'Account3.' In FIG. 16E, the user responds to the financial institution's banking system with the text 'Account1.' In FIG. 16F, the financial institution's banking system forwards a message to the user's mobile device indicating to the user that the user has successfully paid $20.00 from Account1 to Merchant1. The financial institution banking system's message also includes a confirmation number for the successful payment from Account1.

In some embodiments, when the user sets up the user's alias to be associated with payment requests, the user may have indicated 'Account1' to be the default account from which payment requests are to be satisfied. In such embodiments, when the user sends the 'Pay Now' message to the financial institution's banking system (FIG. 16B), the user is presented with, on the user's mobile device, the confirmation message of FIG. 16F, rather than the confirmation message of FIG. 16C. Alternatively, the user is presented with the confirmation message of FIG. 16C, and the funds for the payment amount are automatically debited from the default account even though this is not indicated in FIG. 16C.

FIGS. 17A-17F illustrate screenshots of interfaces of a mobile device that receives a payment request from a financial institution's banking system, and enables a user to respond to the payment request. The interfaces presented in FIGS. 17A-17F are merely exemplary, and the interfaces in other embodiments may include more information (or less information) than that presented in FIGS. 17A-17F.

Figure 17A:
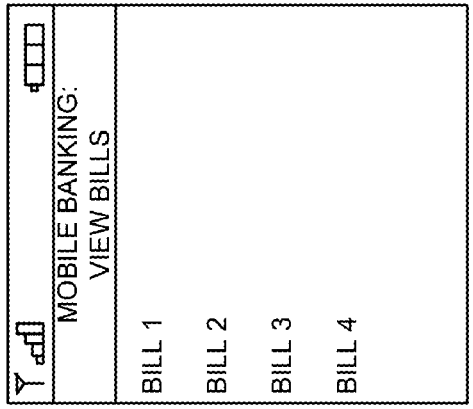

FIG. 17A presents an alert to the user of the mobile device. The alert informs the user that the user has received a new payment request (e.g., a new bill). As used herein, a bill refers to a payment request from a person or an entity. The alert also presents a selectable digital option, which when selected by the user takes the user to the mobile billing center associated with a mobile banking application. In some embodiments, the user may select the selectable digital option by clicking on it or touching it. In some embodiments, when the user selects the selectable digital option of FIG. 17A (i.e., the 'Click Here' option), the user is directly taken to the interface presented in FIG. 17D. In other embodiments, when the user selects the selectable digital option, the user is taken to the interface presented in FIG. 17B.

Figure 17B:
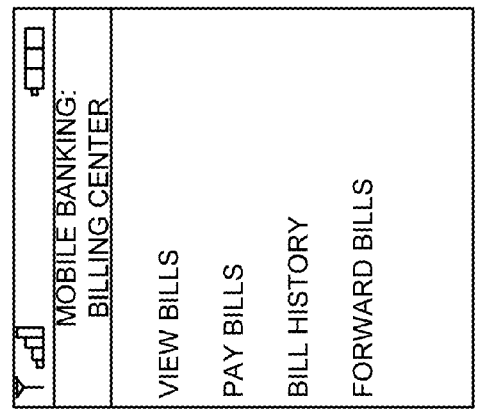
Figure 17C:
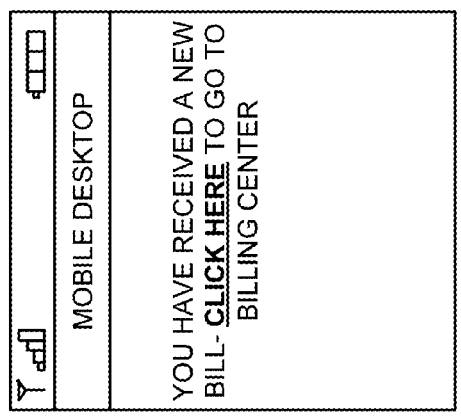

FIG. 17B presents the mobile banking billing center homepage which is presented on the user interface in some embodiments when the user selects the 'Click Here' option in FIG. 17A. As indicated in FIG. 17B, the mobile device interface allows the user to 'View Bills,' 'Pay Bills,' view 'Bill History,' and 'Forward Bills.' When the user selects the 'View Bills' option, the user may be presented with all the current bills that are outstanding. When the user selects the 'Pay Bills' option, the user may be taken to a payment center where the user can satisfy all current outstanding bills. When the user selects the 'Bill History' option, the user may be presented with recent bills satisfied by the user during a predetermined period of time (e.g., preceding two months). When the user selects the 'Forward Bills' option, the user may be presented with bills that a user may forward to another user so that the other user may satisfy the payment request. When the user selects the 'View Bills' option, as indicated in FIG. 17C, the user is presented with 'Bill 1,' 'Bill 2,' 'Bill 3,' and 'Bill 4.' Each bill is presented as a selectable option. When the user selects 'Bill 1,' the user is presented with the interface displayed by FIG. 17D.

Figure 17D:
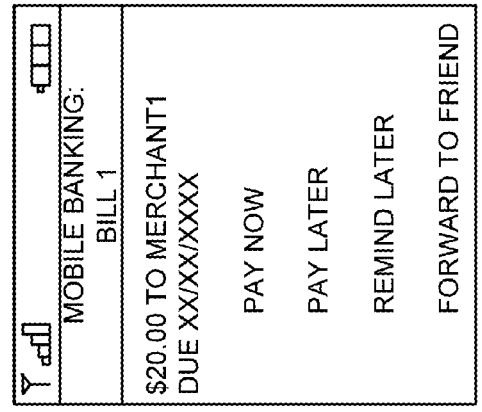
Figure 17E:
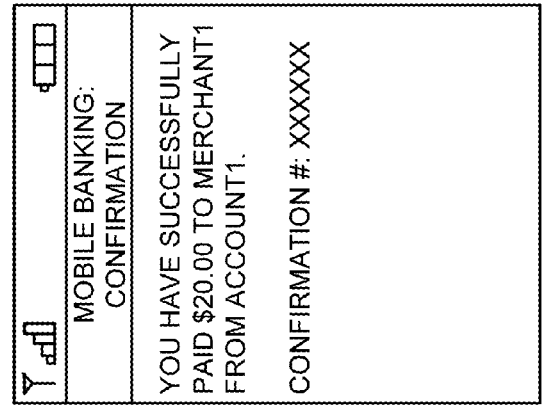

FIG. 17D presents details regarding Bill 1. FIG. 17D indicates that Bill 1 is a payment request from Merchant1 for $20.00. FIG. 17D also indicates the due date for Bill 1. Additionally, FIG. 17D presents selectable options: 'Pay Now,' 'Pay Later,' 'Remind Later,' and 'Forward to Friend.' When the user selects 'Pay Now,' the user indicates to the financial institution's banking system that the user wishes to pay immediately from a default banking account associated with satisfying payment requests. Alternatively, as presented in FIG. 17E, when the user selects 'Pay Now,' the mobile device interface presents the user with selectable account options ('Account 1' and 'Account 2') that the user can use to satisfy the payment request. Furthermore, when the user selects 'Pay Later' option in FIG. 17D, the mobile device interface may prompt the user for details regarding the date when the user would like to schedule a payment to satisfy the payment request. Furthermore, when the user selects 'Remind Later' option in FIG. 17E, the mobile device interface may prompt the user for details regarding the date when the user would like to be reminded about the payment request. Alternatively, the mobile application interface may not prompt the user for details regarding when the user would like to be reminded about the bill; instead, the mobile application may automatically configured to remind the user after a predetermined period of time (e.g., one week before the due date of the bill, two days before the due date of the bill, and the like). Furthermore, when the user selects the 'Forward to Friend' option in FIG. 17E, the mobile device interface may prompt the user for contact details of the friend (e.g., mobile phone number, email address, social network account, and the like) to whom the payment request may be forwarded.

Figure 17F:
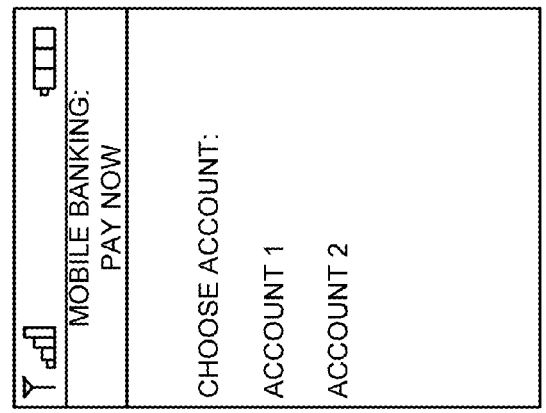

In FIG. 17F, the financial institution's banking system forwards a message to the user's mobile device indicating to the user that the user has successfully paid $20.00 from Account1 to Merchant1. The financial institution banking system's message also includes a confirmation number for the successful payment from Account1.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for communicating a payment request to a recipient, the method comprising:

receiving, at an intermediary computing device, the payment request from a source system, wherein the payment request includes a payment amount, a payment due date, a name associated with the recipient and an alias associated with the recipient, wherein the payment request requests the recipient to make a payment associated with the payment amount, wherein the alias associated with the recipient is different from the name associated with the recipient;

in response to receiving the payment request, determining, via a computing device processor, whether the recipient is a registered recipient based on the alias, wherein determining whether the recipient is a registered recipient based on the alias comprises:

determining whether the alias included in the payment request matches a second alias in an alias data repository; and in response to determining the alias included in the payment request matches the second alias in the alias data repository, determining whether the name included in the payment request matches a name associated with the second alias;

in response to determining the recipient is a registered recipient based on the alias, communicating, via the intermediary computing device, the request to the recipient based on the recipient being the registered recipient;

in response to determining the recipient is not a registered recipient based on the alias, returning the payment request to the source system and sending an invitation to the recipient to register the alias associated with the recipient so that the recipient receives a future payment request that includes a payment amount and the registered alias;

communicating the payment request to the recipient as a mobile application alert, wherein the mobile application alert includes one or more selectable options, wherein a first selectable option enables the recipient to immediately pay the payment amount associated with the payment request, a second selectable option enables the recipient to schedule payment of the payment amount on a selected date, and a third selectable option enables the recipient to select an account from which to pay the payment amount of the payment request, wherein the first selectable option, the second selectable option, and the third selectable option are presented simultaneously on a user interface;

determining whether the payment amount is greater than a maximum payment amount; and in response to determining the payment amount is greater than the maximum payment amount, initiating presentation of an error message.

2. The method of claim 1, wherein the alias is at least one of: a mobile phone number, an email address, or a social network account.

3. The method of claim 2, further comprising:

communicating the payment request to the recipient as a text message, wherein the text message indicates one or more response options, and wherein a first response option enables the recipient to immediately pay the payment amount associated with the payment request, a second response option enables the recipient to schedule payment of the payment amount on a selected date, and a third response option enables the recipient to select an account from which to pay the payment amount of the payment request.

4. The method of claim 1, wherein the alias data repository comprises information regarding users and aliases associated with each user.

5. The method of claim 1, wherein the source system is associated with a merchant, wherein the payment request comprises a bill payment associated with the merchant, wherein the recipient does not provide information associated with the recipient's financial institution account or payment card to the merchant, and wherein the recipient does not provide identification information associated with the recipient's merchant account to the intermediary computing device.

6. The method of claim 1, wherein the source system is associated with an entity, and the recipient does not provide the recipient's entity account number to the intermediary computing device.

7. A computer program product for online payment, the computer program product comprising a non-transitory computer-readable medium having computer-executable instructions for performing:

receiving, at an intermediary computing device, the payment request from a source system, wherein the payment request includes a payment amount, a payment due date, a name associated with the recipient and an alias associated with the recipient, wherein the payment request requests the recipient to make a payment associated with the payment amount, wherein the alias associated with the recipient is different from the name associated with the recipient;

in response to receiving the payment request, determining, via a computing device processor, whether the recipient is a registered recipient based on the alias, wherein determining whether the recipient is a registered recipient based on the alias comprises:

determining whether the alias included in the payment request matches a second alias in an alias database; and in response to determining the alias included in the payment request matches the second alias in the alias database, determining whether the name included in the payment request matches a name associated with the second alias;

in response to determining the recipient is a registered recipient based on the alias, communicating, via the intermediary computing device, the payment request to the recipient based on the recipient being the registered recipient;

in response to determining the recipient is not a registered recipient based on the alias, returning the payment request to the source system and sending an invitation to the recipient to register the alias associated with the recipient so that the recipient receives a future payment request that includes a payment amount and the registered alias;

communicating the payment request to the recipient as a mobile application alert, wherein the mobile application alert includes one or more selectable options, wherein a first selectable option enables the recipient to immediately pay the payment amount associated with the payment request, a second selectable option enables the recipient to schedule payment of the payment amount on a selected date, and a third selectable option enables the recipient to select an account from which to pay the payment amount of the payment request, wherein the first selectable option, the second selectable option, and the third selectable option are presented simultaneously on a user interface;

determining whether the payment amount is greater than a maximum payment amount; and in response to determining the payment amount is greater than the maximum payment amount, initiating presentation of an error message.

8. The computer program product of claim 7, wherein the alias is at least one of: a mobile phone number, an email address, or a social network account.

9. The computer program product of claim 8, wherein the non-transitory computer-readable medium is further configured to perform:

communicating the payment request to the recipient as a text message, wherein the text message indicates one or more response options, and wherein a first response option enables the recipient to immediately pay the payment amount associated with the payment request, a second response option enables the recipient to schedule payment of the payment amount on a selected date, and a third response option enables the recipient to select an account from which to pay the payment amount of the payment request.

10. The computer program product of claim 7, wherein the alias data repository comprises information regarding users and aliases associated with each user.

11. The computer program product of claim 7 wherein the source system is associated with a merchant, wherein the payment request comprises a bill payment associated with the merchant, wherein the recipient does not provide information associated with the recipient's financial institution account or payment card to the merchant, and wherein the recipient does not provide identification information associated with the recipient's merchant account to the intermediary computing device.

12. The computer program product of claim 7, wherein the source system is associated with an entity, and the recipient does not provide the recipient's entity account number to the intermediary computing device.

13. A system for communicating a payment request to a recipient, the system comprising:
   a computer apparatus including a processor and a memory; and
   a module stored in the memory, executable by the processor and configured to:
   receive the payment request from a source system, wherein the payment request includes a payment amount, a payment due date, a name associated with the recipient and an alias associated with the recipient, wherein the payment request requests the recipient to make a payment associated with the payment amount, wherein the alias associated with the recipient is different from the name associated with the recipient;
   in response to receiving the payment request, determine whether the recipient is a registered recipient based on the alias, wherein determining whether the recipient is a registered recipient based on the alias comprises:
   determining whether the alias included in the payment request matches a second alias in an alias database; and
   in response to determining the alias included in the payment request matches the second alias in the alias database, determining whether the name included in the payment request matches a name associated with the second alias;
   in response to determining the recipient is a registered recipient based on the alias, communicate the payment request to the recipient based on the recipient being the registered recipient;
   in response to determining the recipient is not a registered recipient based on the alias, return the payment request to the source system and send an invitation to the recipient to register the alias associated with the recipient so that the recipient receives a future payment request that includes a payment amount and the registered alias;
   communicate the payment request to the recipient as a mobile application alert,
   wherein the mobile application alert includes one or more selectable options, wherein a first selectable option enables the recipient to immediately pay the payment amount associated with the payment request, a second selectable option enables the recipient to schedule payment of the payment amount on a selected date, and a third selectable option enables the recipient to select an account from which to pay the payment amount of the payment request, wherein the first selectable option, the second selectable option, and the third selectable option are presented simultaneously on a user interface;
   determine whether the payment amount is greater than a maximum payment amount; and
   in response to determining the payment amount is greater than the maximum payment amount, initiate presentation of an error message.

14. The system of claim 13, wherein the alias is at least one of: a mobile phone number, an email address, or a social network account.

15. The system of claim 14, wherein the module is further configured to:
   communicate the payment request to the recipient as a text message,
   wherein the text message indicates one or more response options, and
   wherein a first response option enables the recipient to immediately pay the payment amount associated with the payment request, a second response option enables the recipient to schedule payment of the payment amount on a selected date, and a third response option enables the recipient to select an account from which to pay the payment amount of the payment request.

16. The system of claim 13, wherein the alias data repository comprises information regarding users and aliases associated with each user.

17. The system of claim 13, wherein the source system is associated with a merchant, wherein the payment request comprises a bill payment associated with the merchant, wherein the recipient does not provide information associated with the recipient's financial institution account or payment card to the merchant, and wherein the recipient does not provide identification information associated with the recipient's merchant account to the system.

18. The system of claim 13, wherein the source system is associated with an entity, and the recipient does not provide the recipient's entity account number to the system.

* * * * *